(12) United States Patent
Rodriguez

(10) Patent No.: US 8,548,810 B2
(45) Date of Patent: Oct. 1, 2013

(54) ORCHESTRATED ENCODING AND DECODING MULTIMEDIA CONTENT HAVING PLURAL DIGITAL WATERMARKS

(75) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 273 days.

(21) Appl. No.: 12/939,930

(22) Filed: Nov. 4, 2010

(65) Prior Publication Data

US 2011/0161086 A1   Jun. 30, 2011

Related U.S. Application Data

(60) Provisional application No. 61/258,155, filed on Nov. 4, 2009, provisional application No. 61/266,105, filed on Dec. 2, 2009.

(51) Int. Cl.
  *G06K 9/00*   (2006.01)

(52) U.S. Cl.
  USPC ............................ 704/273; 382/100; 713/176

(58) Field of Classification Search
  USPC ........................... 704/273; 382/100; 713/176
  See application file for complete search history.

(56) References Cited

U.S. PATENT DOCUMENTS

| | | | |
|---|---|---|---|
| 5,502,576 A * | 3/1996 | Ramsay et al. ............... | 358/444 |
| 5,526,427 A | 6/1996 | Thomas et al. | |
| 5,719,937 A | 2/1998 | Warren et al. | |
| 5,963,909 A | 10/1999 | Warren et al. | |
| 6,411,725 B1 | 6/2002 | Rhoads | |
| 6,505,160 B1 | 1/2003 | Levy et al. | |
| 6,674,876 B1 | 1/2004 | Hannigan et al. | |
| 6,845,360 B2 | 1/2005 | Jensen et al. | |
| 6,871,180 B1 | 3/2005 | Neuhauser et al. | |
| 7,020,304 B2 | 3/2006 | Alattar et al. | |
| 7,209,571 B2 | 4/2007 | Davis et al. | |
| 7,562,392 B1 | 7/2009 | Rhoads et al. | |
| 8,094,949 B1 | 1/2012 | Rhoads | |
| 8,107,674 B2 | 1/2012 | Davis et al. | |
| 2002/0097891 A1* | 7/2002 | Hinishi ......................... | 382/100 |
| 2002/0114459 A1* | 8/2002 | Belenko et al. ............... | 380/201 |
| 2002/0122564 A1* | 9/2002 | Rhoads et al. ................ | 382/100 |
| 2002/0164046 A1* | 11/2002 | Walker et al. ................. | 382/100 |
| 2003/0009670 A1* | 1/2003 | Rhoads ......................... | 713/176 |
| 2003/0112974 A1* | 6/2003 | Levy ............................. | 380/210 |
| 2004/0120544 A1* | 6/2004 | Eguchi et al. ................. | 382/100 |
| 2005/0210526 A1 | 9/2005 | Levy et al. | |
| 2007/0277039 A1* | 11/2007 | Zhao ............................. | 713/176 |
| 2008/0310673 A1* | 12/2008 | Petrovic et al. ............... | 382/100 |
| 2009/0031134 A1* | 1/2009 | Levy ............................. | 713/176 |
| 2010/0082478 A1* | 4/2010 | Van Der Veen et al. ........ | 705/39 |
| 2010/0280641 A1 | 11/2010 | Harkness et al. | |

OTHER PUBLICATIONS

Woo et al. "Multiple Watermark Method for Privacy Control and Tamper Detection in Medical Images", APRS Workshop on Digital Image Computing, Australia, Feb. 2005.*

Mark, et al. "Experimental Study on Watermark Interference in Multiple Re-Watermarking", Security, Steganography, and Watermarking of Multimedia Contents IX, USA, Jan. 2007.*

(Continued)

*Primary Examiner* — Jialong He
(74) *Attorney, Agent, or Firm* — Digimarc Corporation

(57) ABSTRACT

Orchestrated encoding schemes facilitate encoding and decoding of data in content signals at several points in the distribution path of content items. Orchestrated encoding adheres to a set of encoding rules that enables multiple watermarks and corresponding applications to co-exist, avoids collisions among watermarks, and simplifies metadata and routing database infrastructure.

15 Claims, 20 Drawing Sheets

(56) References Cited

OTHER PUBLICATIONS

Cox et al. "A review of watermarking and the importance of perceptual modeling", Proc. of Electronic Imanging, Feb. 1997.*

Xu et al. "Digital Audio Watermarking and Its Application in Multimedia Database", Fifth International Symposium on Signal Processing and its Applications, Aug. 1999.*

RIAA Payload Specification, Version 1.0, Mar. 6, 2009.

* cited by examiner

ORCHESTRATED ENCODING AND DECODING MULTIMEDIA CONTENT HAVING PLURAL DIGITAL WATERMARKS

RELATED APPLICATION DATA

This patent application claims the benefit of U.S. Provisional Application Nos. 61/258,155, filed Nov. 4, 2009, and 61/266,105, filed Dec. 2, 2009, which are hereby incorporated by reference.

TECHNICAL FIELD

The invention relates to multimedia content identification and management, steganography, digital watermarking, signal recognition and signal pattern matching, and associated protocols for orchestrating these communication and identification technologies in multimedia content distribution channels.

BACKGROUND AND SUMMARY

Digital watermarking has been deployed as an effective way to encode and then later retrieve auxiliary data in multimedia content after it has been distributed. One advantage is that the encoded data persists within the host media signal, even in environments where the content has been transformed for distribution or re-distribution in different distribution channels, like networks, broadcast channels, digital to analog conversion and back again, ambient air transmission and capture, etc. When implemented in systems for content identification, measurement and management, it can operate in concert with other content identification technologies, and support a range of applications. The world is rapidly transforming from one of mostly linear, single channel modes of distribution, to a highly non-linear world of content distribution and re-distribution (e.g., viral distribution on networks, transcoding for many devices, formats, geographic regions and markets). In this non-linear world, the likelihood arises that content signals are encoded with digital watermarks two or more times from initial creation to distribution and possible re-distribution on various communication channels. Content fingerprints can be used to identify content through pattern matching and related content recognition methods as a supplement to encoded data. Nevertheless, the need for unique identification (unique serialization of content), encoding of information other than mere identification, and efficient and/or offline decoding (e.g., when pattern matching database is not available or can no longer scale) necessitate use of digital watermarking. Given the need for such encoding, and in some cases, multiple layers of encoding, there is a challenge of limitations on the capacity of the watermark data channel within a unit of content, as well as collisions among different watermarks. Barring fundamental change in communication theory, channel capacity is a finite resource for watermarking.

Orchestration of encoded content is required to thrive in resource constrained environments. Such orchestration may be accomplished through bi-directional communication, such as the case where a first watermark is detected, interpreted, communicated to a system for orchestrating previous encoding with subsequent encoding, and then re-encoded. Often times the opportunity to re-encode with knowledge and maintenance of prior watermarks is not possible.

Objects that adhere to a common set of rules can maximize utilization of a scarce resource. Examples of such objects include data packets communicated in computer networks, insects, game theory, etc.

An orchestrated watermark encoding strategy can address the challenges posed by limited data encoding capacity of a host signal by implementing rule based encoding. Such a strategy defines a signal, data-link and payload schemas. The payload is the representation of the encoded data in a host signal. The encoding strategy preferably should be extensible, to allow adaptation of the strategy to support new applications and encoding technologies.

One aspect of the invention is a method of digital watermark processing that implements an orchestrated watermark encoding strategy. This method receives a content signal and performs a watermark decoding on the content signal. From the watermark decoding, the method determines a watermark state of the content signal. It then evaluates a watermarking rule based on the watermark state to determine watermark encoding to apply to the content signal to comply with the watermarking rule. Finally, it performs the watermark encoding on the content signal to embed layer of digital watermark into the content signal.

This method is implemented in digital watermark processors that are implemented within the distribution path of content tracks, including audio, visual and audio visual works. Content follows a distribution path that is either linear or non-linear (via broadcast and computer network distribution, or a combination of both). Nodes in the distribution path form a network of watermark processors through which content flows. In a typical implementation, the processors include watermark decoders that identify a watermark state present in the received audio or visual signal and watermark encoders that embed a watermark layer that overwrites, partially overwrites or co-exists with one or more previously embedded watermark layers.

Further features will become apparent with reference to the following detailed description and accompanying drawings.

DETAILED DESCRIPTION

Figure 1:
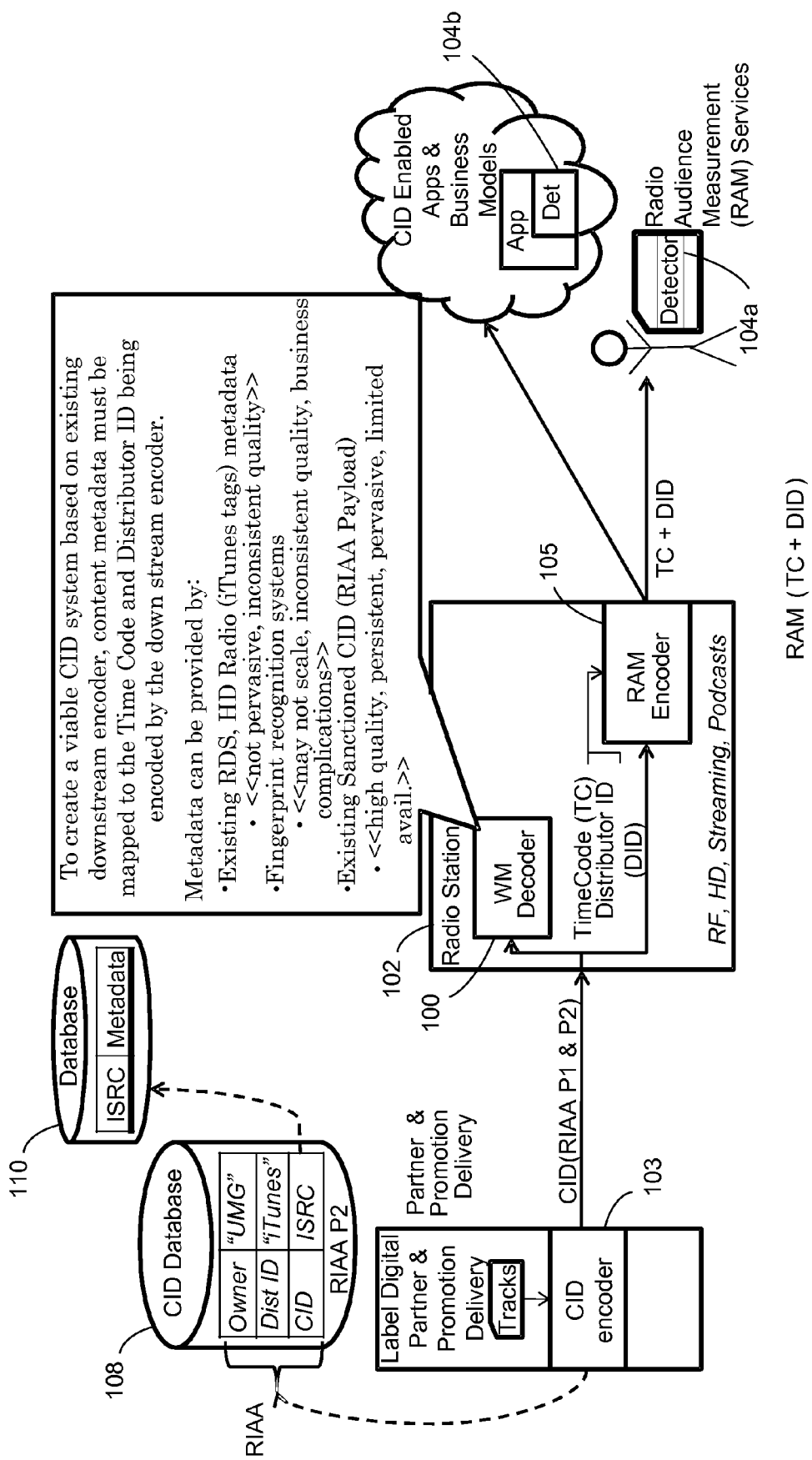
FIGS. 1-8 illustrate a watermarking encoding system for allowing upstream encoding to co-exist with downstream audience measurement encoding, and subsequent detection for both content identifier (CID or content ID) applications and audience measurement.

Digital watermarks are used to communicate N bits of information between a watermark encoder and watermark decoder. The information may be implicit in the presence or absence of the watermark itself (e.g., a single bit of information), encoded in varying states of the watermark (synchronization information such as a 6D phase vector) or explicitly using traditional communication theory constructs and network representations. The N bits may be encoded, for example, using M-ary signaling where message symbols and associated encoded signals correspond to plural bits per message symbol.

Using a network representation, watermark encoders, encode N bits of information within cover art (image, text, video, audio, etc.). The cover art may pass through multiple watermark encoders during the distribution process. If the time component is ignored, this can be modeled as multiple watermark encoders utilizing a common transport medium (Cover Art), similar to other network technologies such as Ethernet.

The N bits of information transmitted by the watermark encoder are a datagram, or a packet of data within a connectionless protocol. This is equivalent to a UDP Packet within the TCP/IP stack, enabling stateless networks to be created, where the watermark encoder and watermark decoder operate without the need to define state before transmission begins.

Utilizing the Open Systems Interconnection (OSI) Model, at the Data Link layer, the issues of flow control and congestion become increasingly important as the number of encoders and decoders utilizing the shared transport medium increase. Techniques from Cognitive Radio provide additional insight into additional methods to manage shared resources.

To maximize the utilization of the discrete bandwidth available in the shared transport medium, minimize collisions and enable a reliable unidirectional network, additional logic is required in the watermark encoders.

This logic, implemented as a rules-based encoding methodology with a common goal, is provided as front-end to existing watermark encoders, to create cognitive encoders. A collection of a cognitive encoders operating on a shared transport medium to achieve a specific goal is an effective form of orchestrated encoding.

Rules:

The rules can implement logic necessary to enforce a specific flow control or bandwidth optimization paradigm. Example rules might utilize techniques from Open loop flow control (similar to Ethernet, listen before your speak then back-off)

Examples of Goals:

Minimize collisions.

Layered encoding (leveraging existing components of another signal)

Multiplexing within constraints (bandwidth, time, visibility/audibility of encoded data)

Enforcing priority of packets (some bits have higher priority than others)

Increased Granularity (repeating an existing signal)

Increased SNR (as an amplifier).

Cognitive Encoding:

Capabilities within the Device:

1. Pre-programmed: Operating on set rules set prior to deployment.

2. Goal Driven: Chooses watermarking parameters such as frequencies, spreading keys, synchronization signals and methods. Approaches based on awareness.

3. Context Awareness: Ability to modify behavior based on the user goals. Are they trying to encode information that has a highly temporal component to it (content synchronized with a specific event in time-based cover art)?

4. Network Aware: Knowledge of the state of the network, presence of other encoders and to optimize rules accordingly.

To illustrate the concepts of orchestrated encoding, we start with illustration of encoding and decoding system and illustrate issues and potential alternatives related to encoding at multiple points in content distribution, starting upstream and then encoding downstream for additional applications (e.g., audience measurement). FIGS. 1-8 illustrate a watermarking encoding system for allowing upstream encoding to co-exist with downstream audience measurement encoding, and subsequent detection for both content ID applications and audience measurement.

In FIG. 1, a watermark decoder 100 in the radio station 102 decodes an upstream encoded watermark carrying a content ID and linking to metadata in a metadata database. As shown in the system of FIG. 1, the upstream encoder 103 embeds a CID into a content track according to the RIAA watermark payload specification, using layers P1 and P2 from that specification. To allow the downstream detector (104a, 104b) to exploit this information, the downstream data that is encoded (the distributor ID and time stamp) by downstream encoder 105 (e.g., Radio Audience Measurement (RAM) encoder) is mapped to the content ID.

Figure 2:
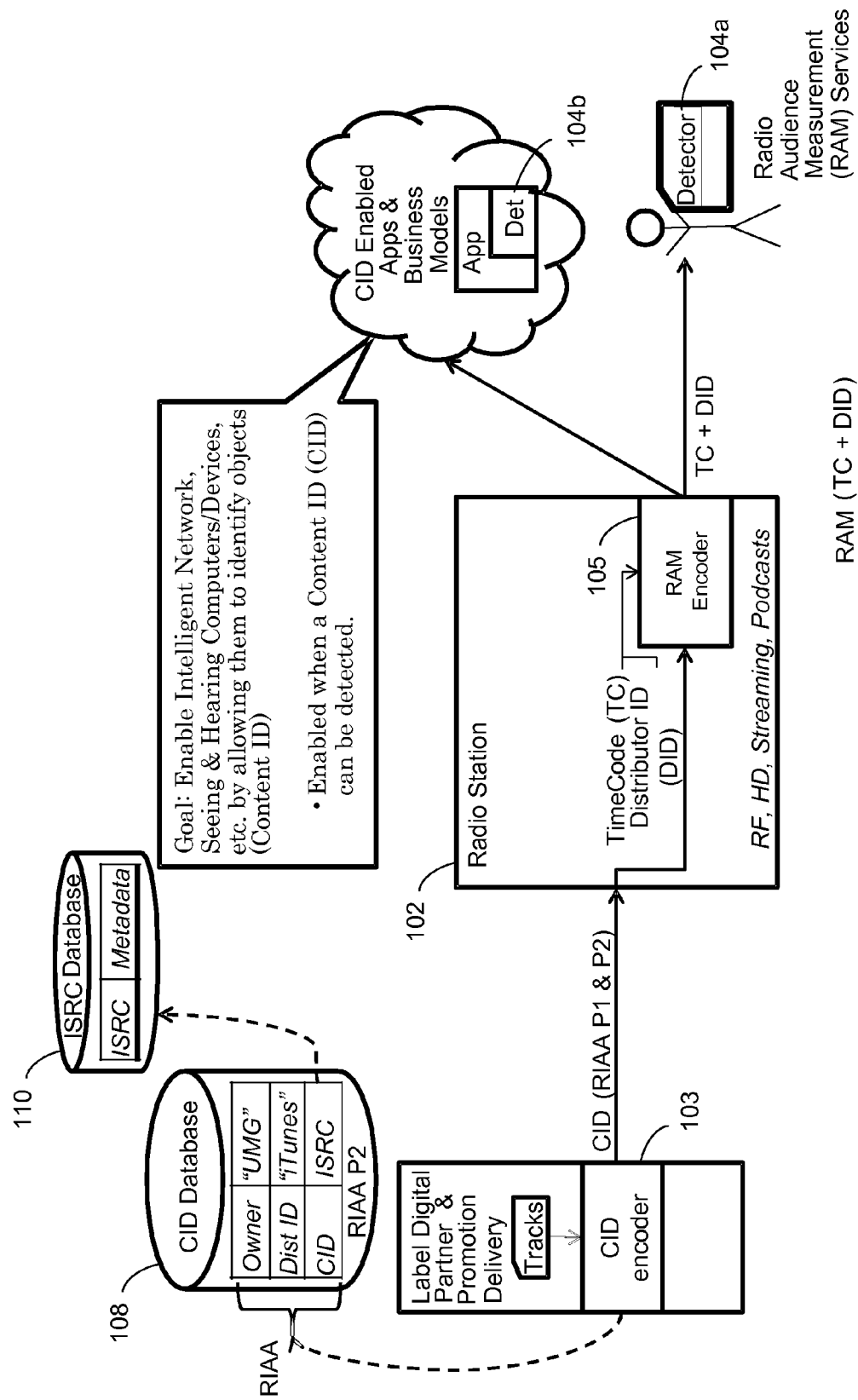

As shown in FIG. 2, the goal is to enable content ID applications, but do so with a robust watermark that can survive ambient air transmission. Since the downstream watermark can survive ambient air transmission and capture, yet does not have sufficient payload for content ID applications, it must be adapted using resolution services. The downstream detector (104b) for CID applications can then detect the distributor ID and time stamp, map it to a content ID, and then enable applications based on the content identification.

Figure 3:
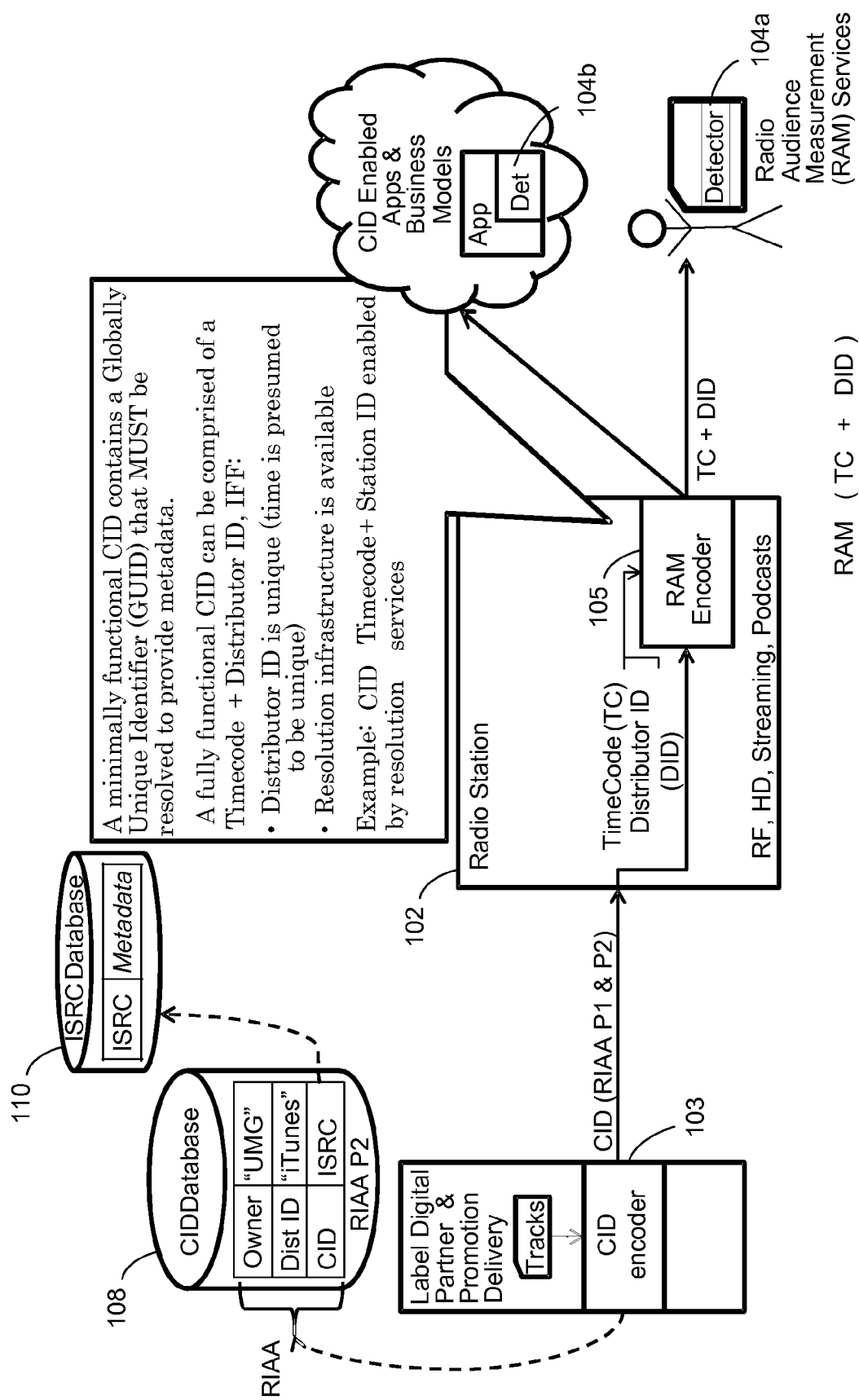
Figure 4:
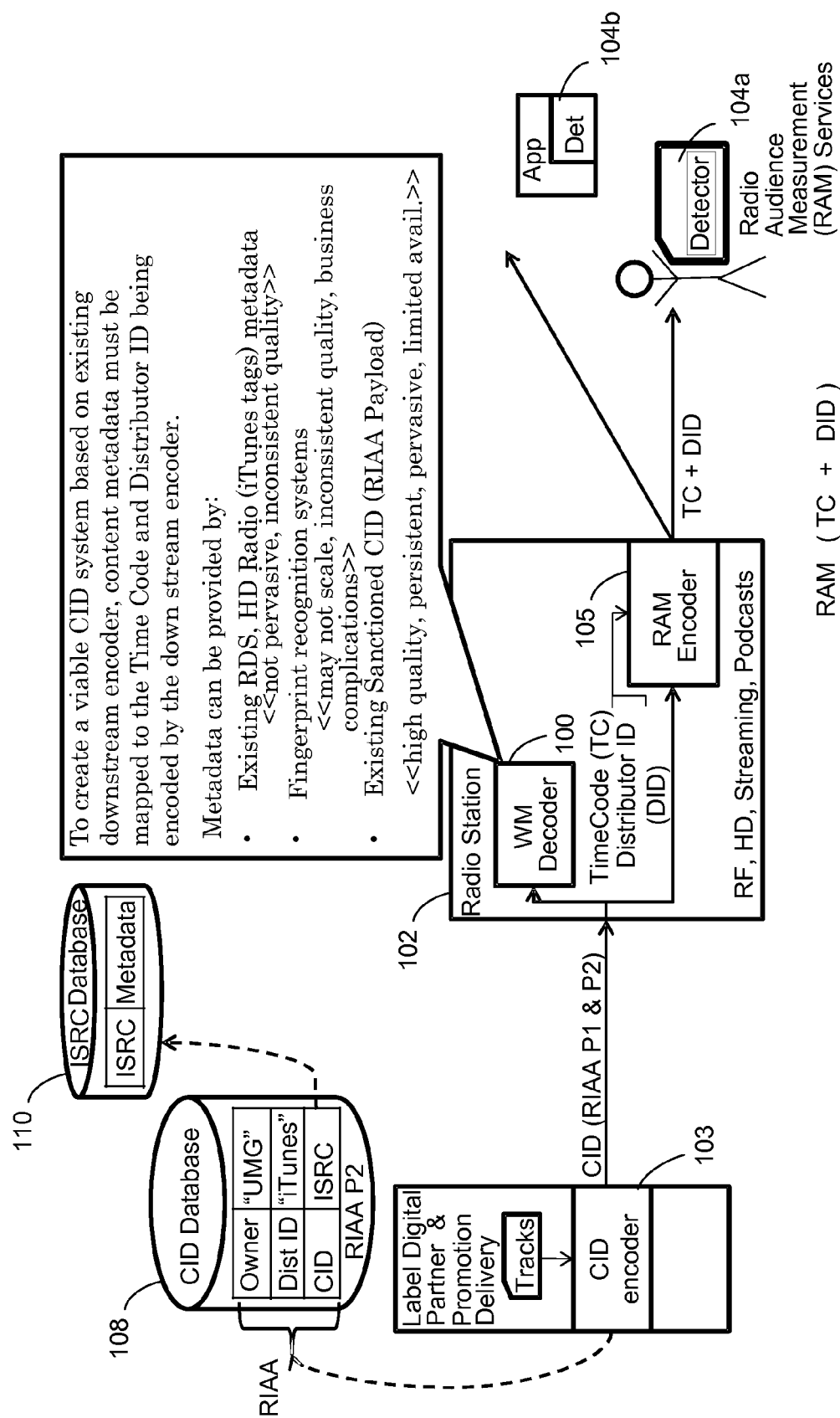
Figure 5:
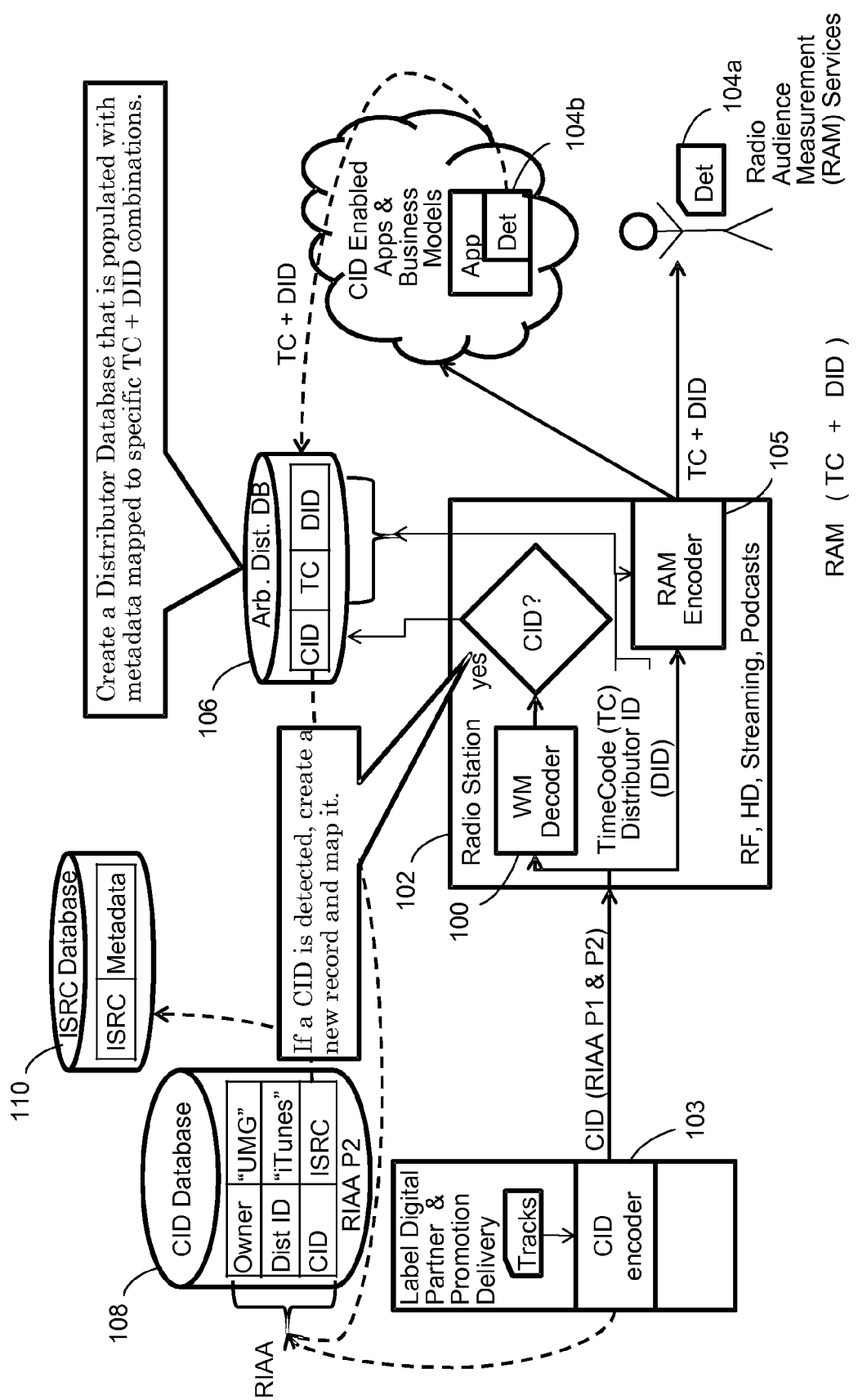
Figure 6:
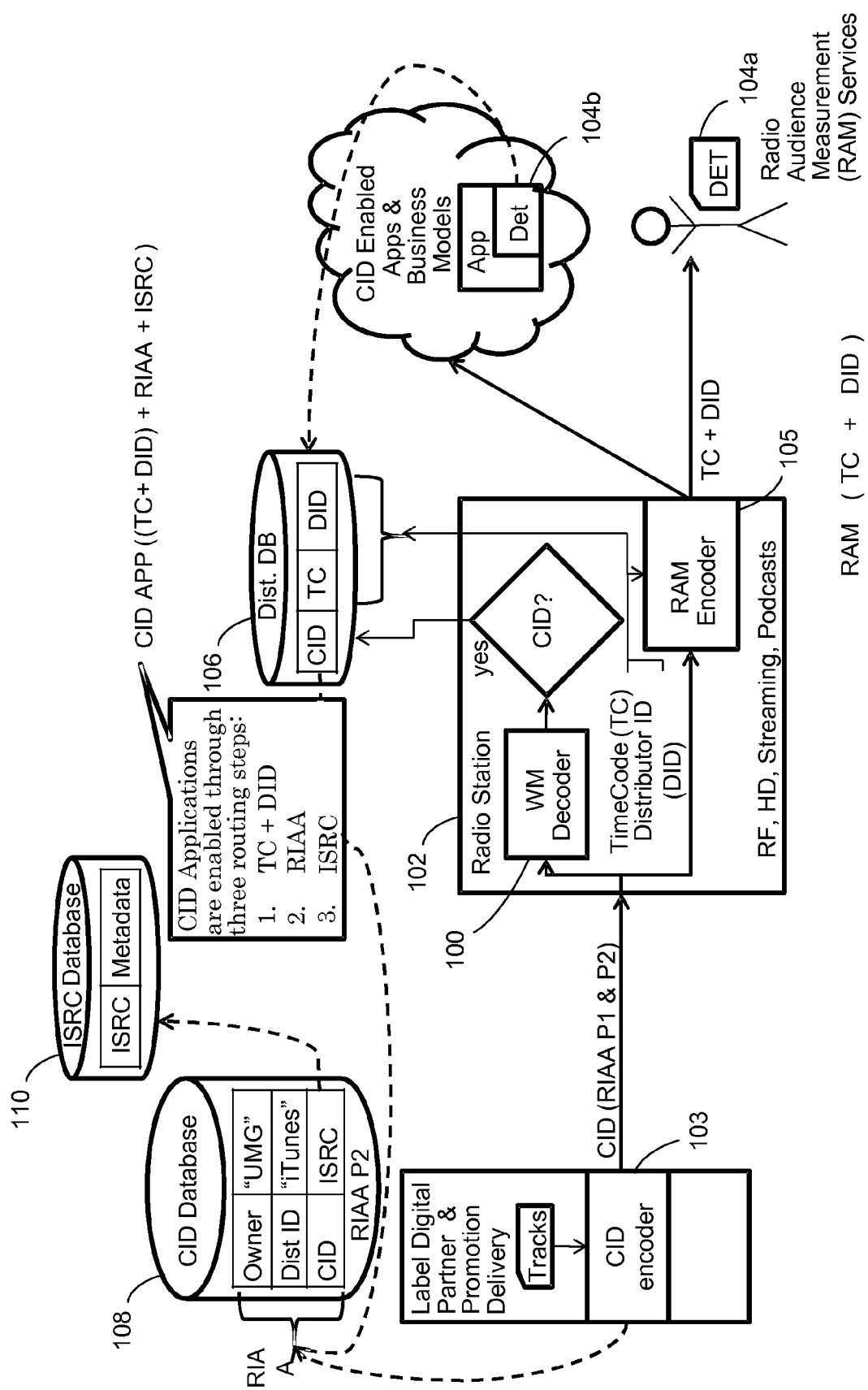
Figure 7:
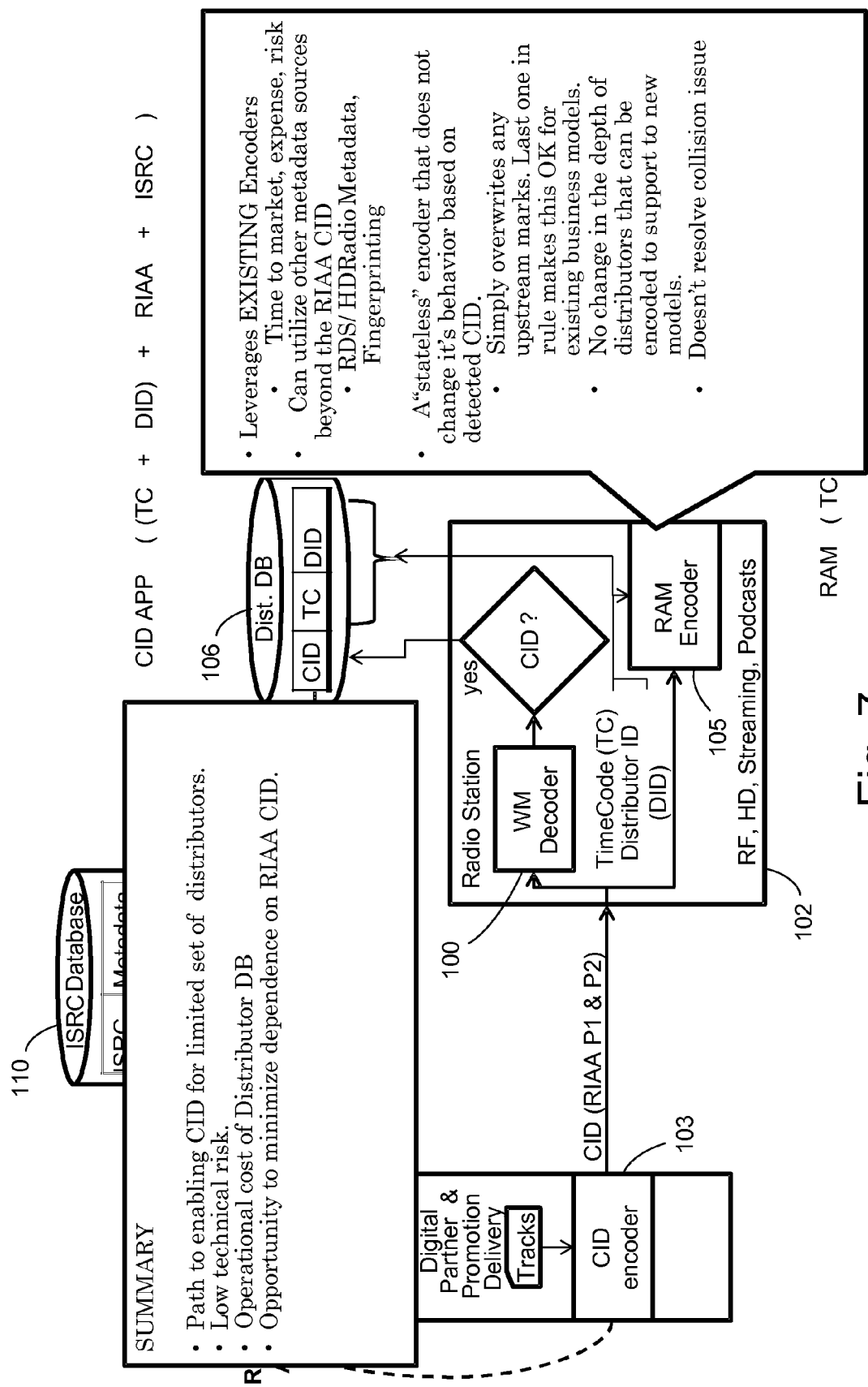
Figure 8:
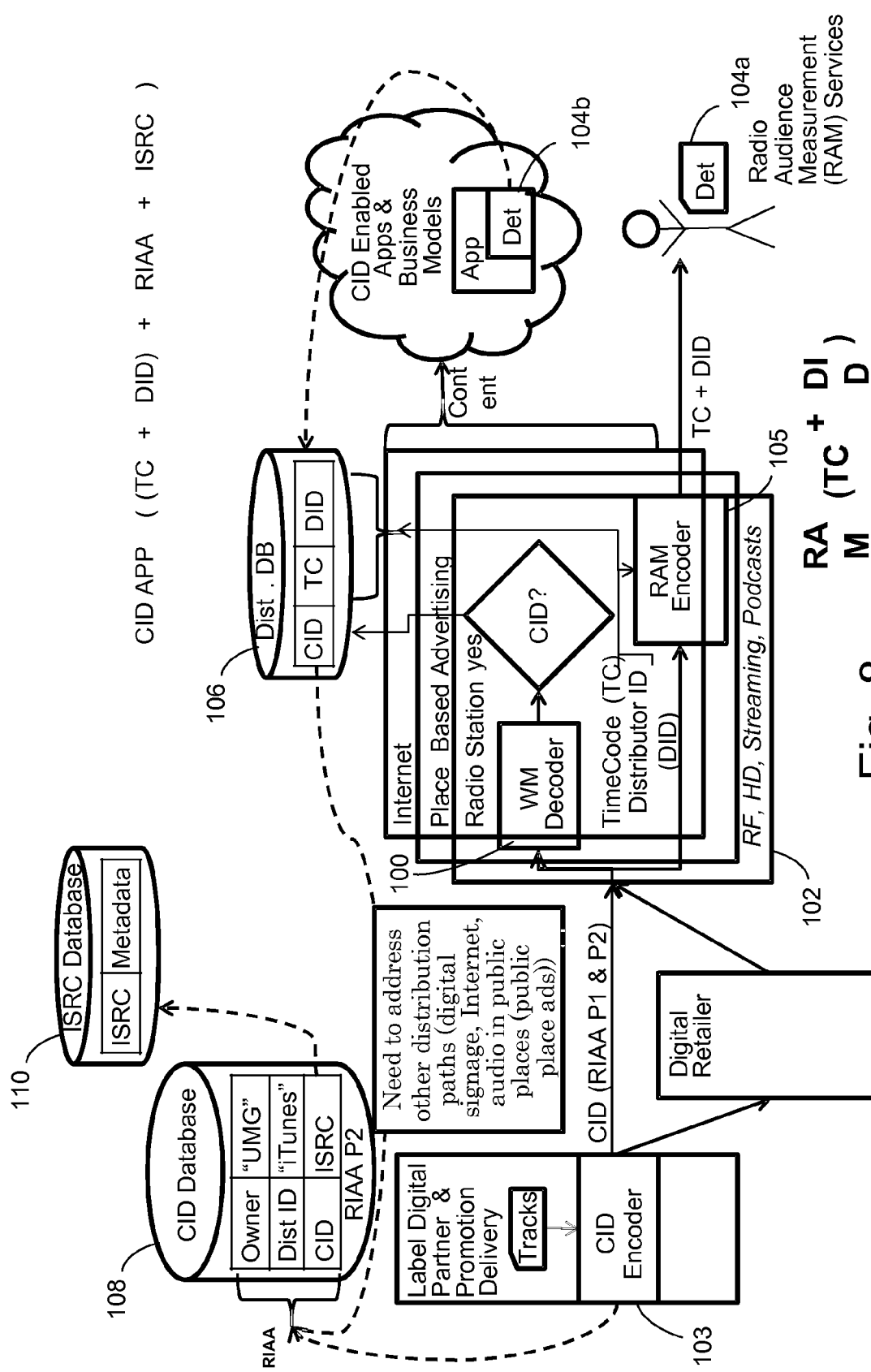

FIGS. 3 and 4 explain how a resolution service maps the Distributor ID and time code into a content ID. FIGS. 5-8 illustrate how the resolution services are implemented in a distributor database 106, mapping CID to time code and distributor ID. This record in the distributor database 106 points to the corresponding CID in the CID database 108, which in turn, points to the ISRC and corresponding metadata in the ISRC database 110. This approach, however, has limitations as content is distributed in multiple different distribution paths, such as Internet and place-based advertising, in addition to radio broadcast.

Figure 9:
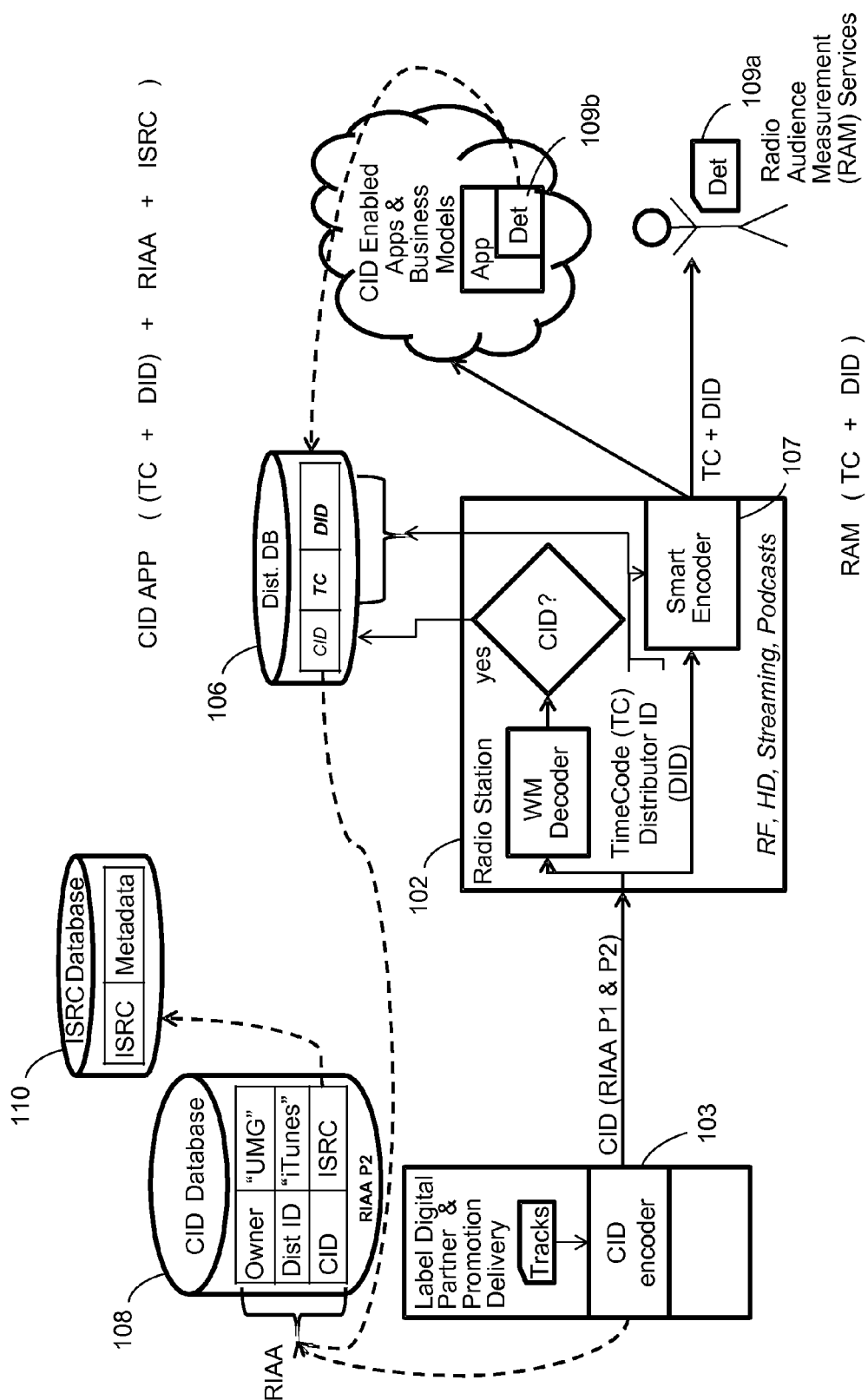
FIG. 9 illustrates an example of orchestrated encoding.

FIG. 9 illustrates an example of orchestrated encoding. This approach resolves the depth of distributor encoding. Due to the need for multiple layers of routing (e.g., 3 in this case), this approach has potential increased cost related to operation of a third (Distributor DB) routing database 106. While it may still incur collision with watermarks (WM's) that do not adhere to the orchestration rules, it improves scalability by creating "Smart" encoders (e.g., 107) downstream in distribution that behave based on a common set of rules, e.g., the "rules of the road." The smart encoders 107 operate according to a defined set of encoding rules that specify: How to detect existing WM's, Identification of encoding protocols, When/how to overwrite existing watermarks, Priority of existing Distributor ID's, Extensible payloads. The result is the creation of an Ad-Hoc Network of Stateless Encoders that are well-behaved. It enables control of collisions, a fixed depth of layered distributor encoding, possibility of unlimited layering of distributor encoding through use of external transaction log, and business models that profit from understanding distribution paths.

Figure 10:
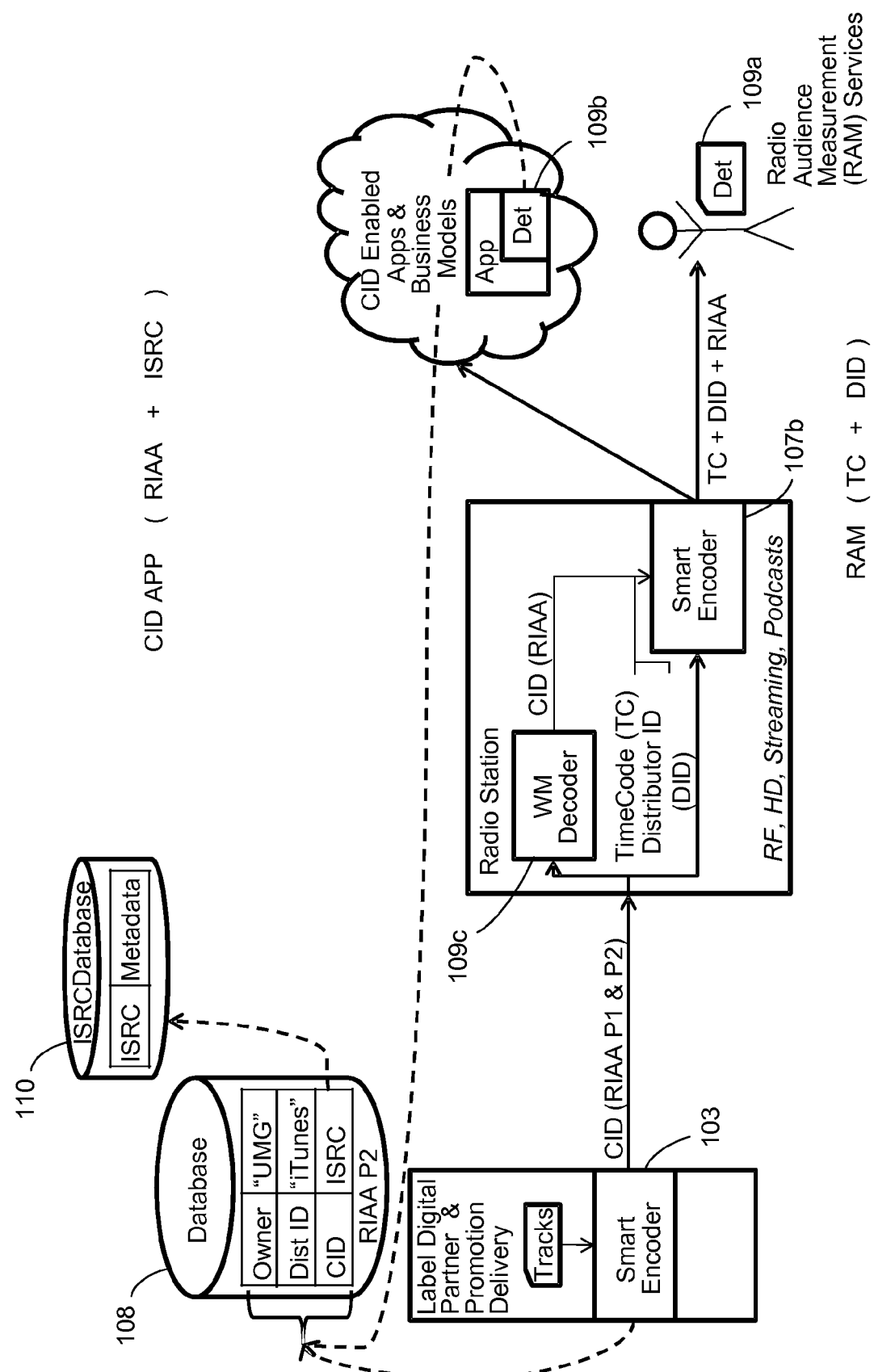
FIG. 10 illustrates a system that propagates smart encoders upstream in the content distribution path.

FIG. 10 illustrates a system that propagates smart encoders 107 upstream in the content distribution path. The smart encoders 107 now reside upstream in the content distribution path at content creation and delivery. This approach eliminates the dependence on third-party technology. Regarding the distributor database, routing is simplified (e.g., routing (2 hops instead of 3)). This approach enables tight coupling of decoder with encoder. It minimizes temporal delay and system complexity, etc.

In the upstream smart encoder 107a, the encoder is adapted to support downstream encoding. One approach is to introduce steganographic markers as synchronization signals at existing low-frequencies (e.g., as used in downstream encoder embodiments). These markers indicate which protocol (rules) are being used. The Content ID payload encoded upstream is encoded in higher frequencies to minimize perceptibility.

In the downstream smart encoder 107b, the following capabilities are implemented. The smart encoder identifies the protocol, which provides the rules for subsequent encoding. As shown in FIG. 10, a compatible decoder 109c attempts to detect, and if present, extracts the watermark payload embedded upstream by smart encoder 107a. An example of rules are:

If Distributor ID (DID)+Time Code (TC) not present, encode.
If DID+TC present, append (if possible), overwrite under certain conditions, log, etc.
Transcode upstream watermark payload into low frequencies to survive ambient detection.

There are a variety of encoding/decoding technologies that can be employed in the above scenarios. One encoding technology is described in U.S. Pat. Nos. 6,871,180 and 6,845,360, which are hereby incorporated by reference in their entirety. Additional methods for layering watermarks are described in U.S. Pat. No. 7,020,304, which is hereby incorporated by reference in its entirety.

Figure 11:
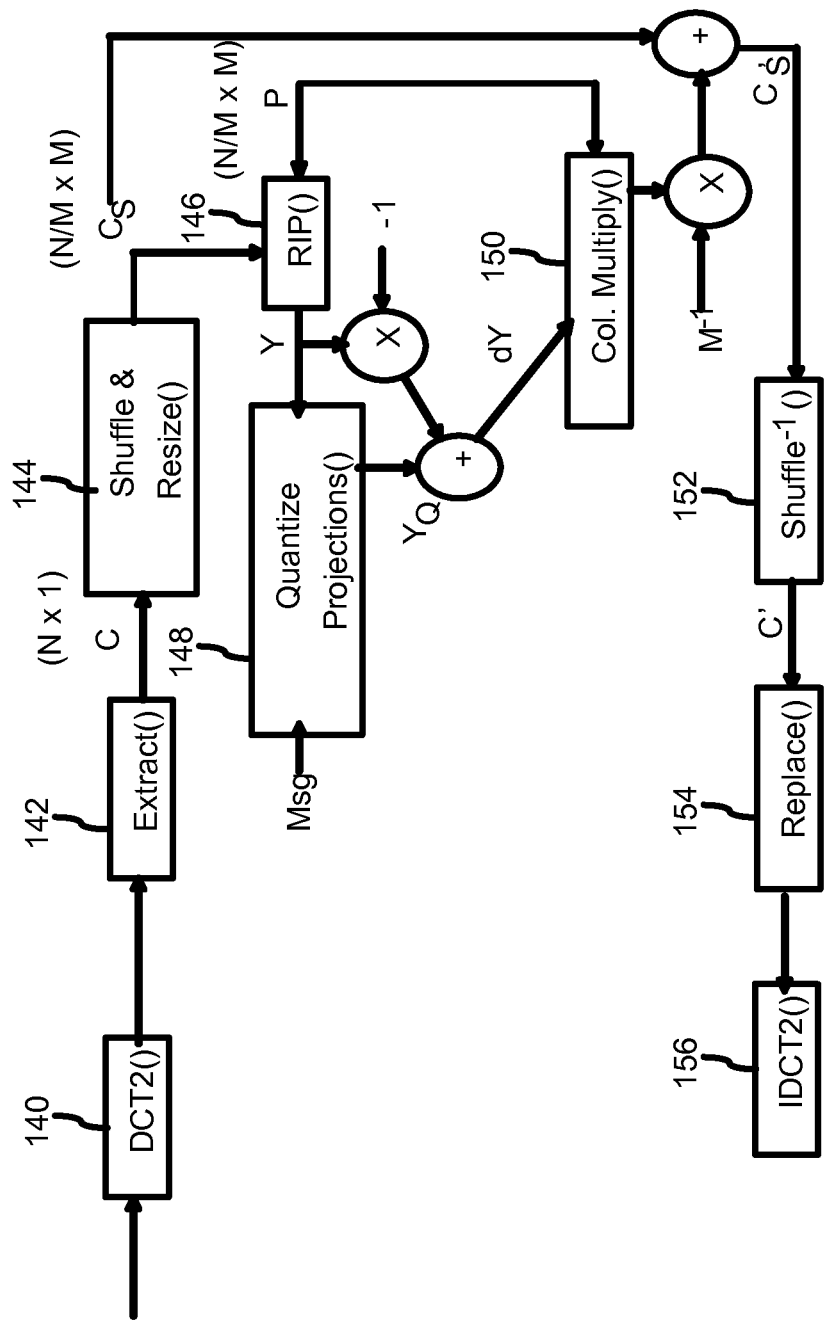
FIG. 11 is a diagram illustrating a steganographic encoder for inserting digital information in a content signal.
Figure 12:
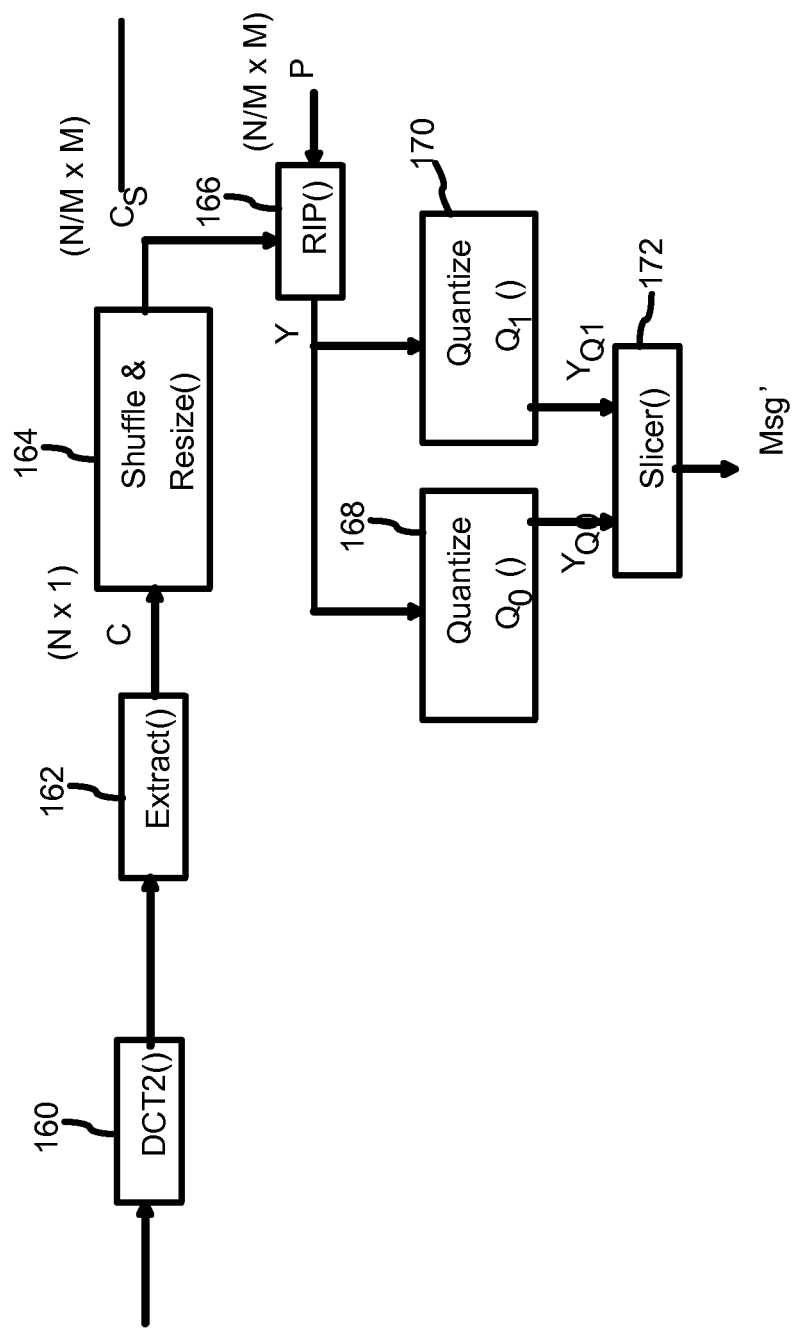
FIG. 12 is a diagram illustrating a steganographic decoder for extracting steganographic information from a signal.
Figure 13A:
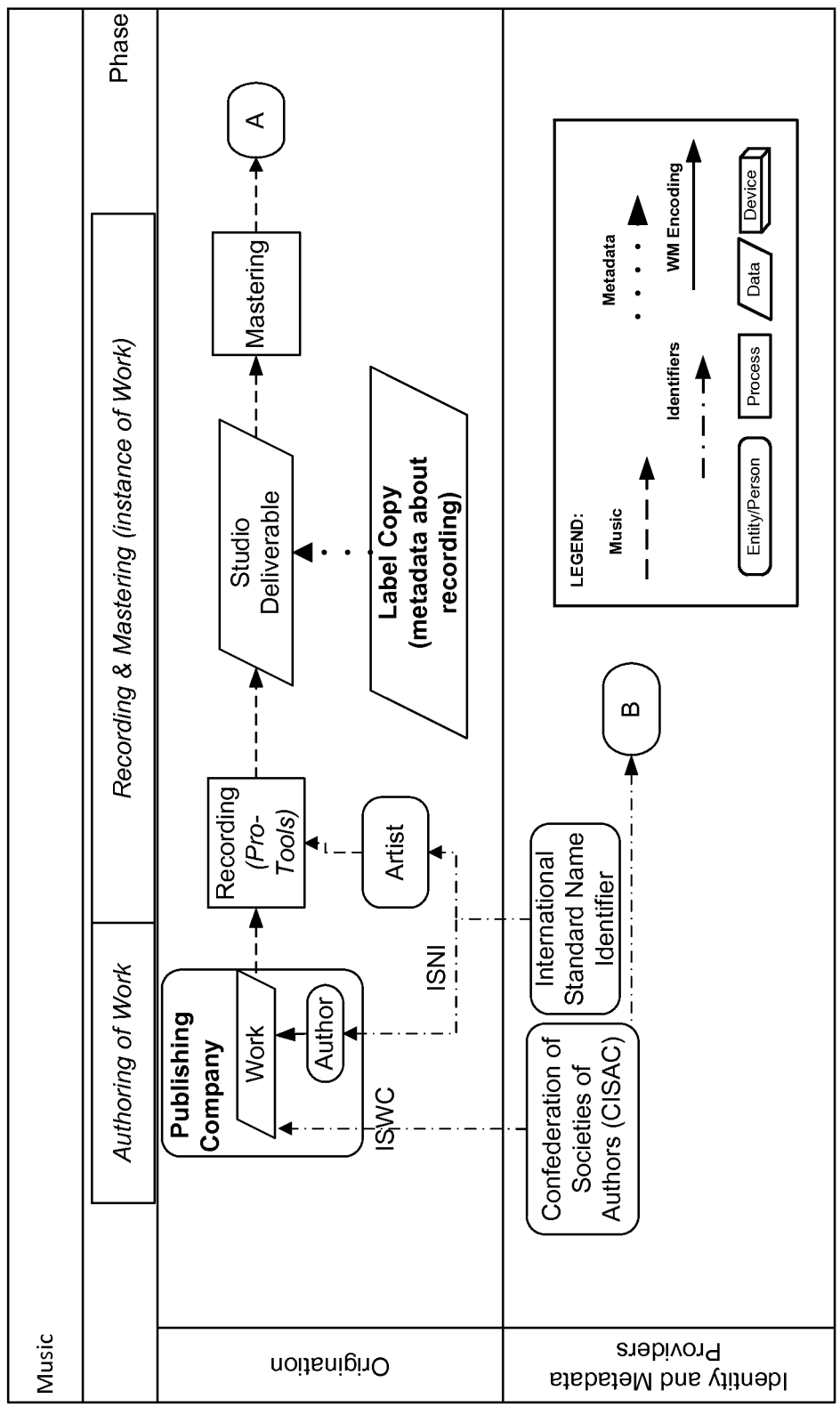
FIGS. 13A-D are a diagram illustrating a content delivery workflow for the music industry.
Figure 13B:
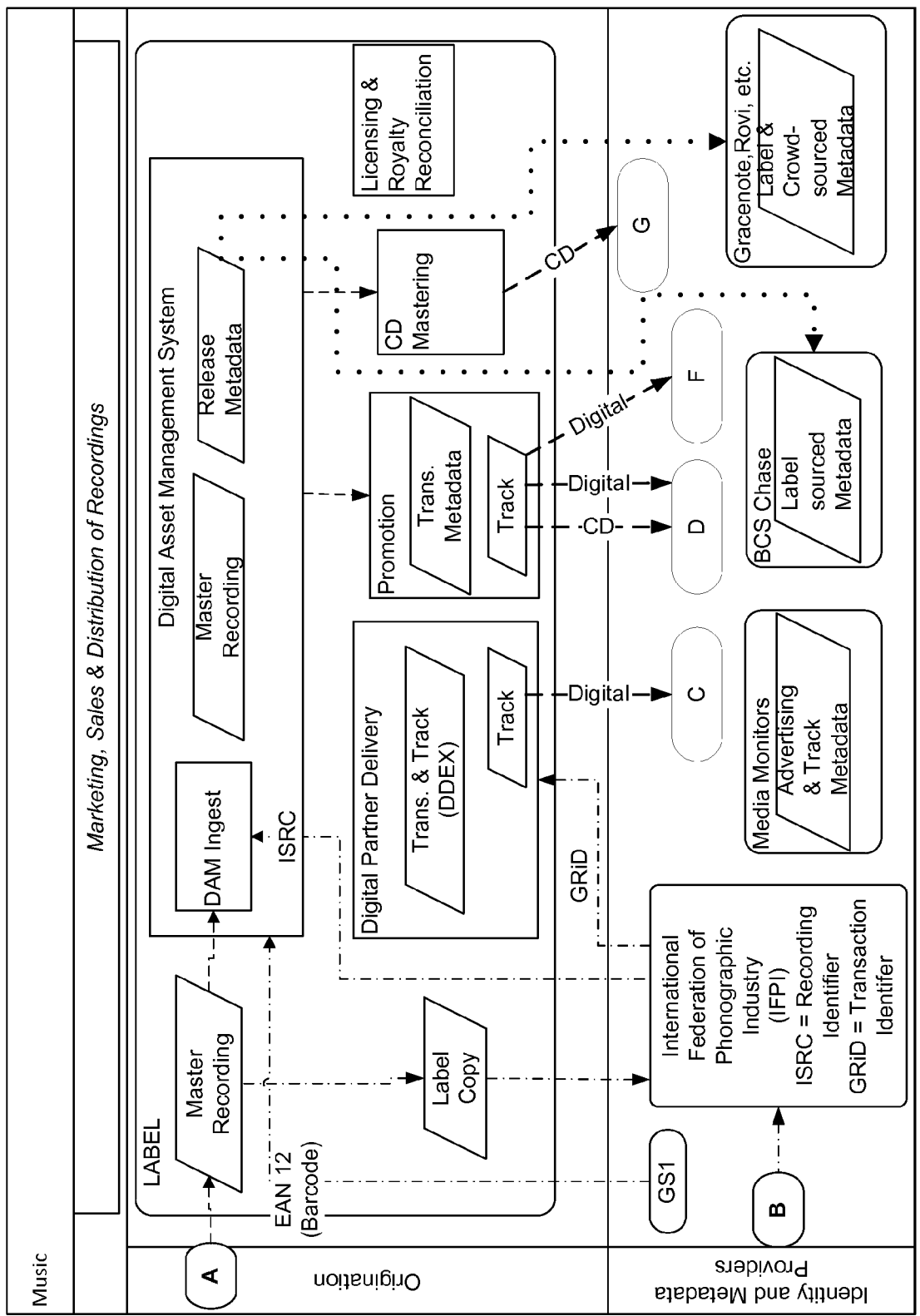
Figure 13C:
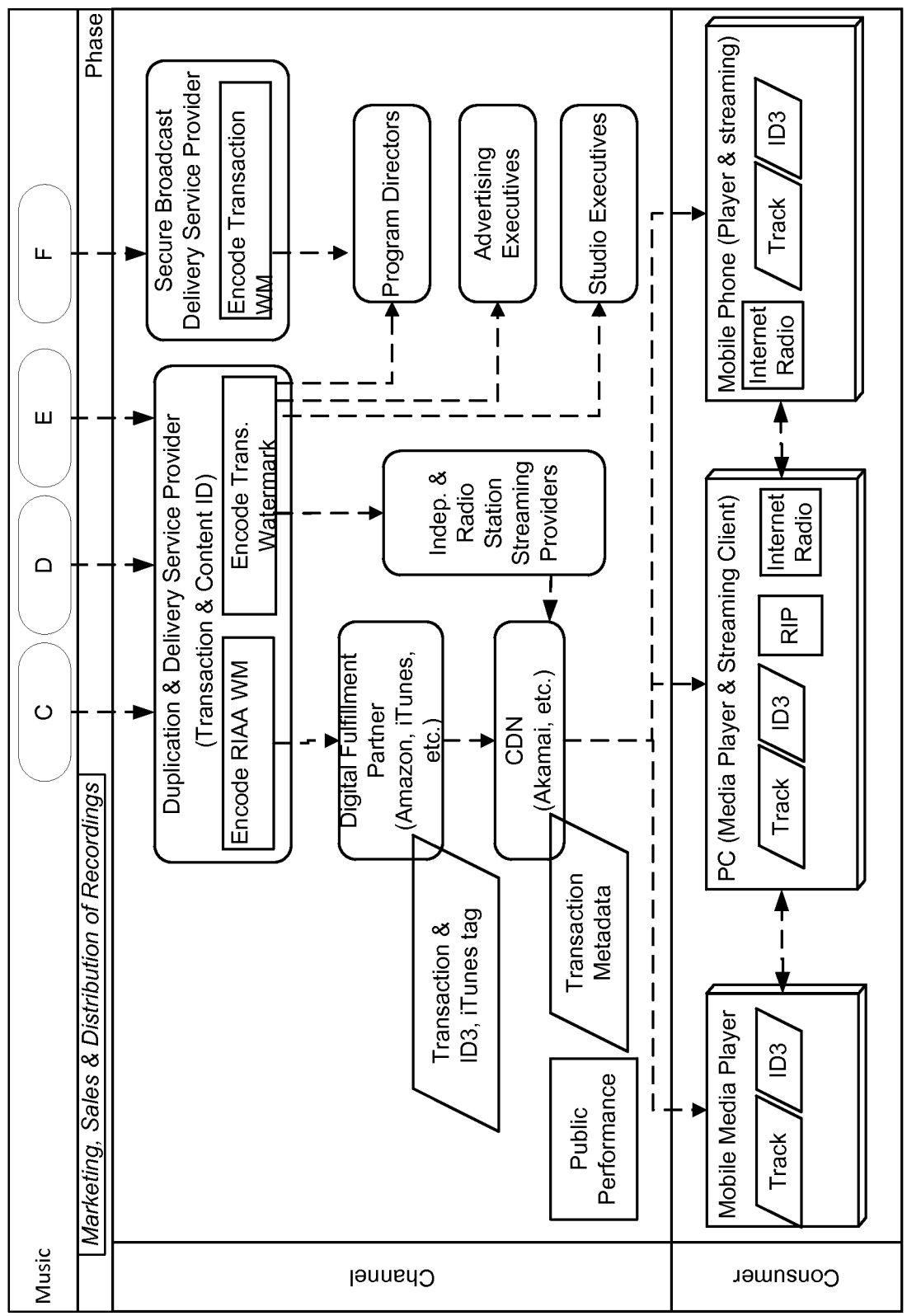
Figure 13D:
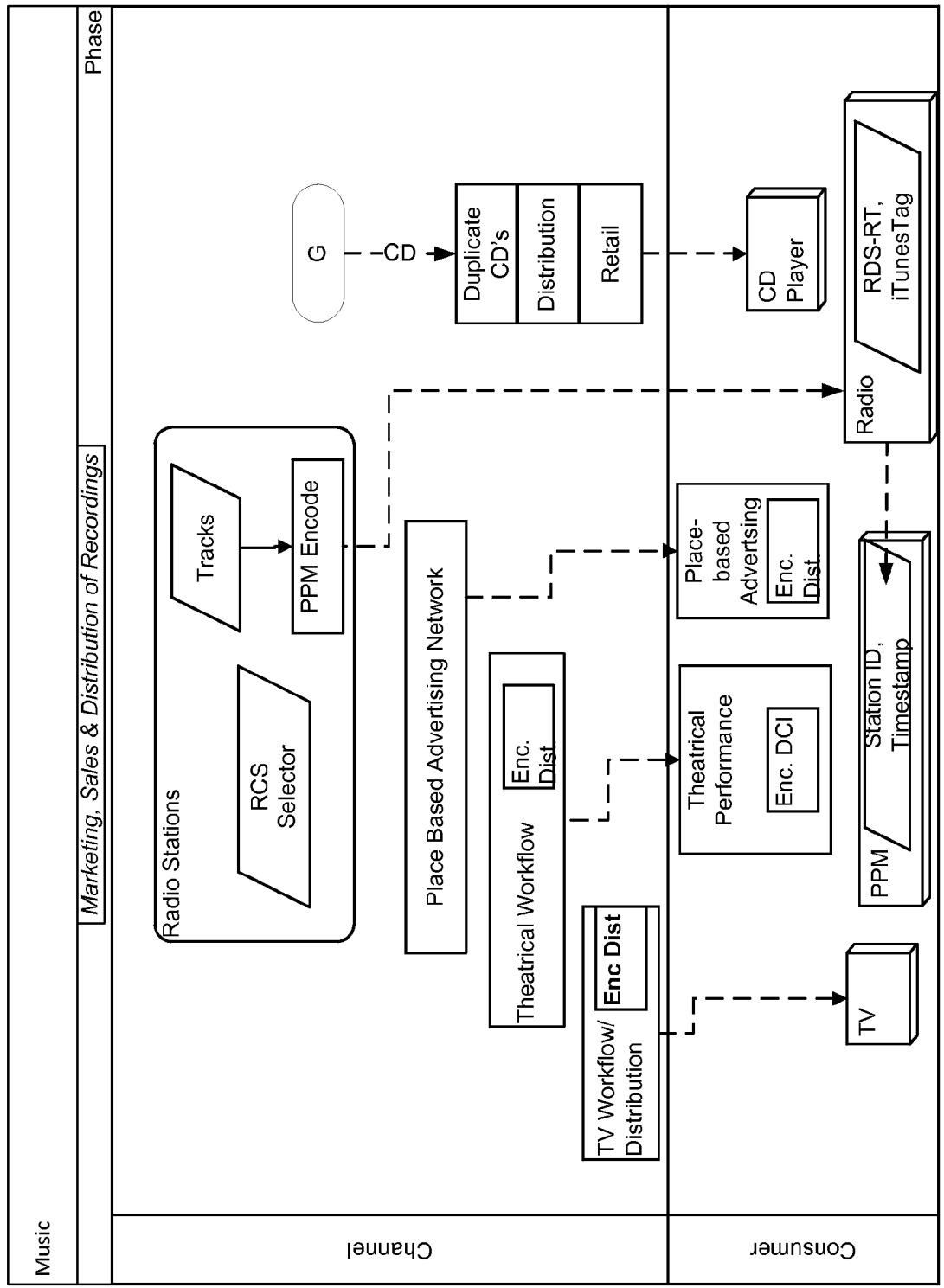
Figure 14A:
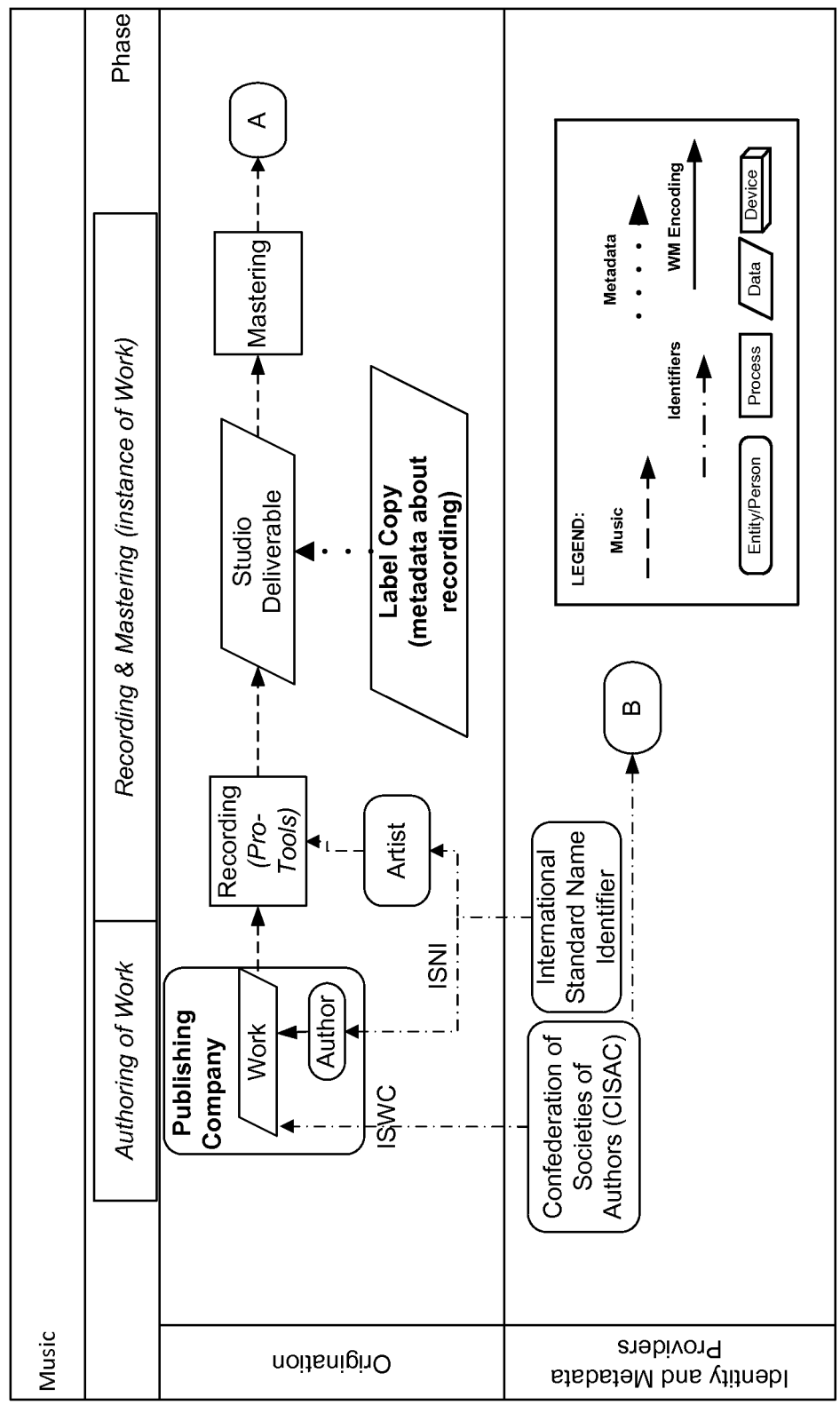
FIGS. 14A-D are an updated version of FIGS. 13A-D that includes orchestrated encoding.
Figure 14B:
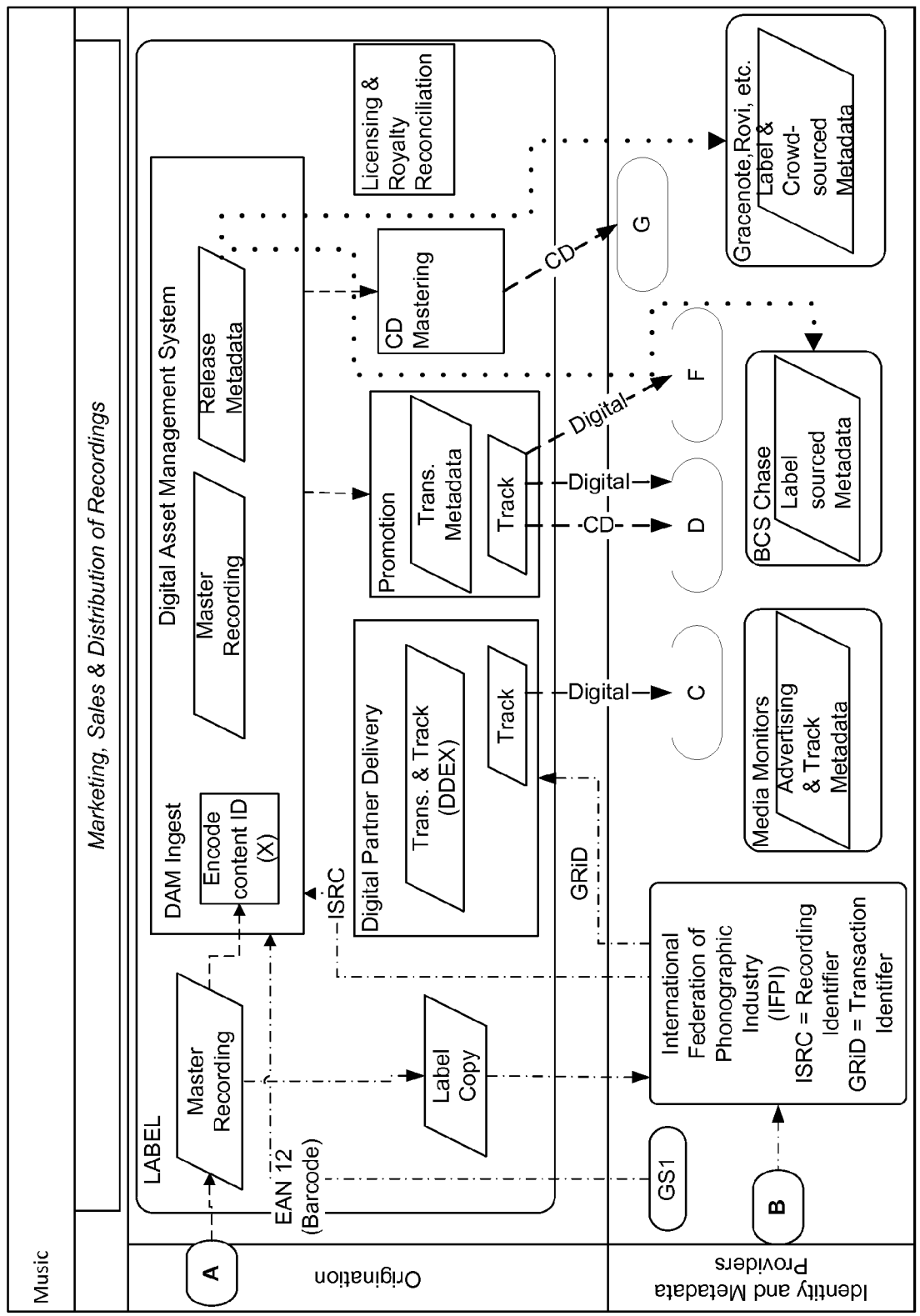
Figure 14C:
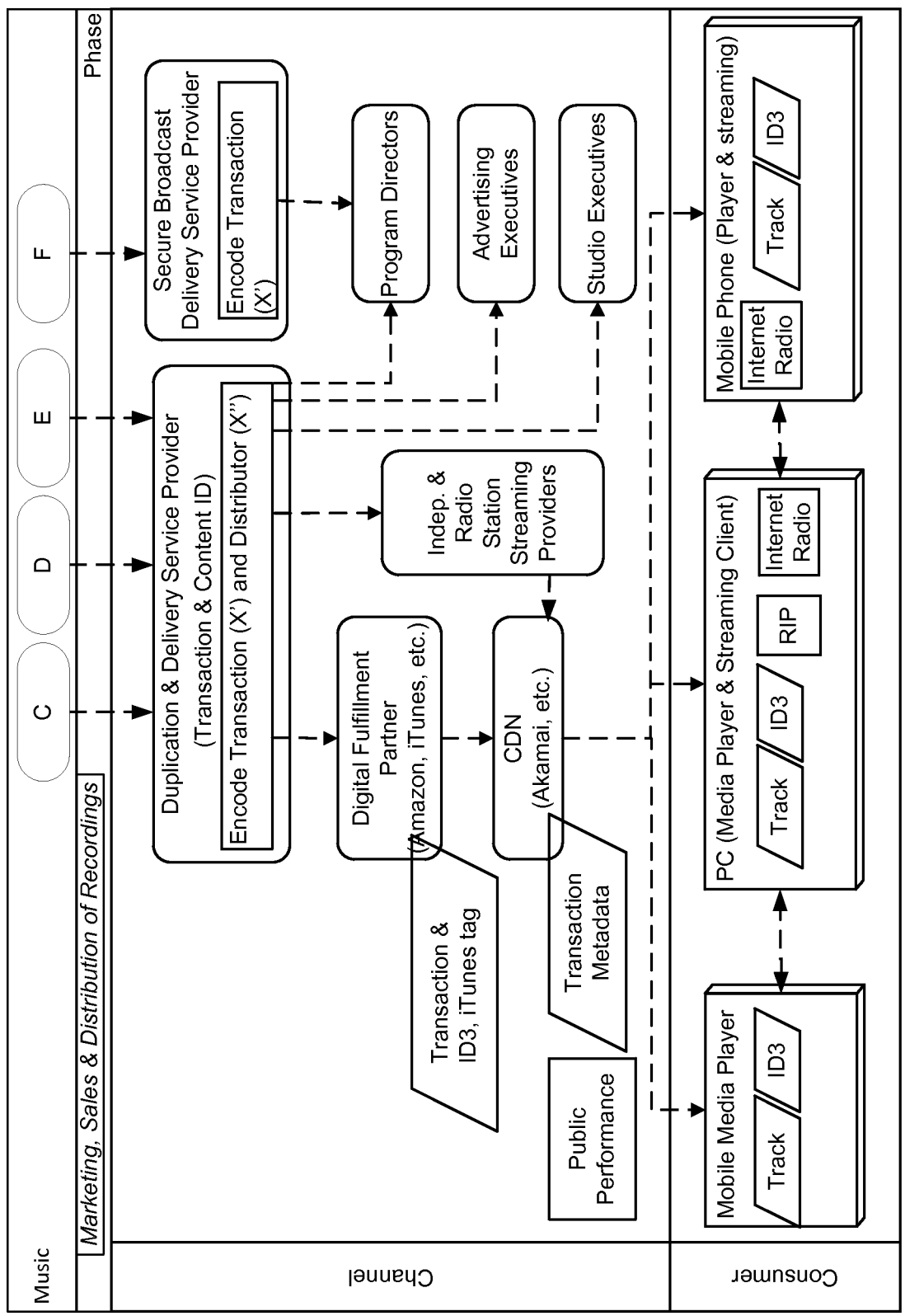
Figure 14D:
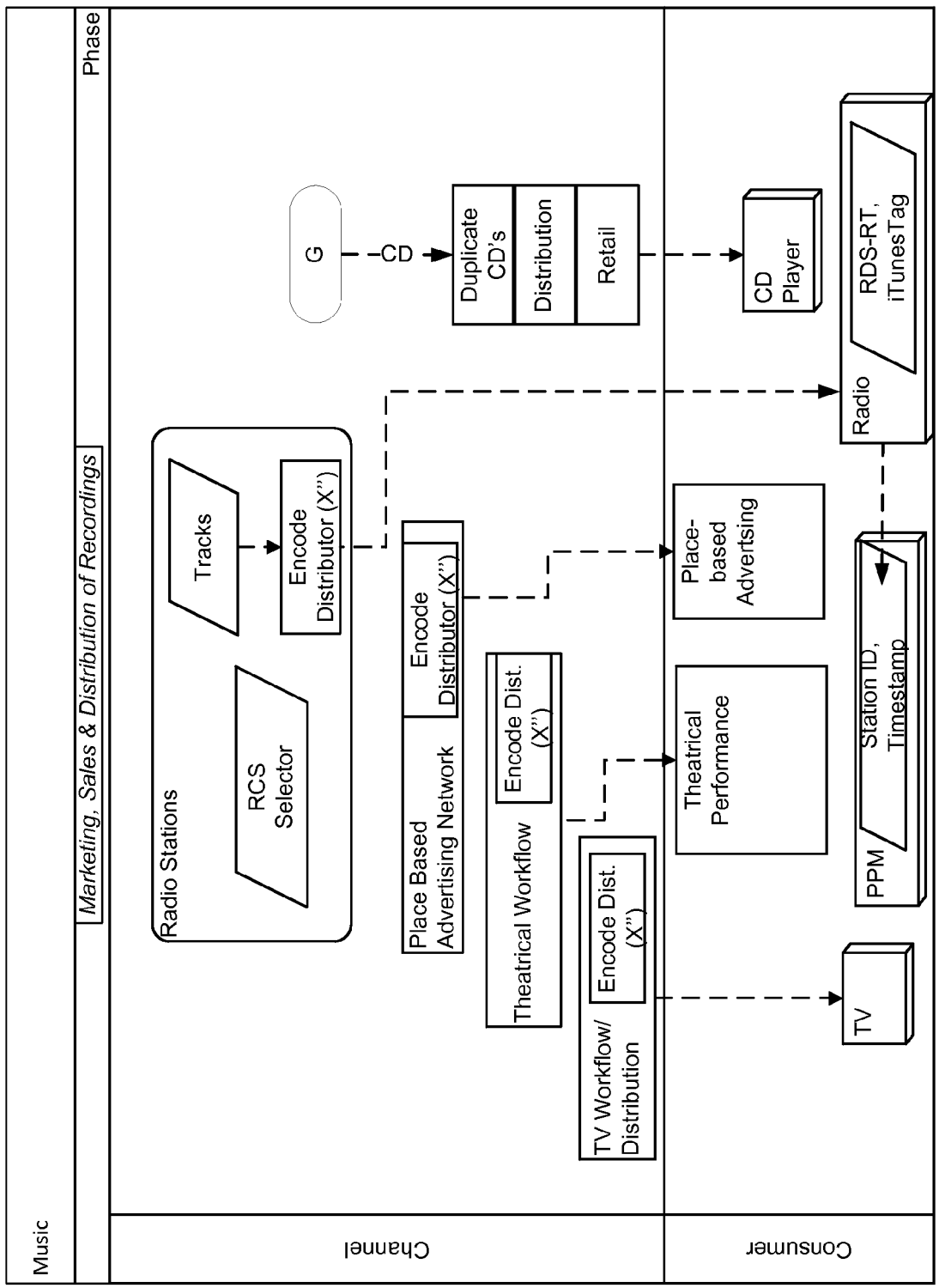

FIGS. 11-12 provide additional examples of encoding and decoding that are readily adaptable to embedding in a variety of distribution formats, such as compressed content signals. Layered encoding and marking codes can be implemented by encoding different layers and marking signals at frequency and time multiplexed signal locations.

FIG. 11 is a diagram illustrating a steganographic encoder for inserting digital information in a content signal. This implementation is designed to compute watermark signals based on transform data of the content signal, such as frequency domain coefficient data (e.g., DCT, MCLT), which is common in a compressed domain representation of video and audio. It also can be adapted to a time frequency spectrogram of an audio signal. See, for example, U.S. Pat. No. 6,674,876, which is hereby incorporated by reference in its entirety.

In the upper left region of the figure, a video signal is input to block 140 labeled "8×8 DCT2( )," where the video image frame is partitioned into non-overlapping 8×8 blocks, and the two-dimensional forward discrete cosine transform (DCT) is applied to each. This DCT transformation is common to video coding standards like MPEG-2 and MPEG-4 and H.264, thus, the steganographic encoder can be integrated with video compression coders that partition video images and compute the DCT transform.

Block 142 labeled "Extract( )" takes the lowest 12 AC coefficients in zig-zag order from each block and places them in an N×1 buffer labeled "C." Block 144 labeled "Shuffle and Resize( )" rearranges the coefficients using a pseudo-random mapping function to yield an N/M×M array, Cs. Hence, each row of M coefficients has representation from diverse sections of the image.

The heart of the embedder resides in the group of operations beginning with block 146 labeled RIP (Row-wise Inner Products) and leading to Cs', the set of embedded coefficients. The RIP block takes the arrays Cs and P (a pseudo-random array with elements {-1,1} also of size N/M×M) as input. The output, Y, is the dot product of each row of Cs with the corresponding row of P. Said another way, each component of the N/M×1 array, Y, is the projection of each row of Cs onto each row of P. The projections are quantized using one of two quantizers 148 for each message bit. For more information on quantization based steganographic embedding, see: U.S. Pat. No. 7,376,242, which is incorporated by reference in its entirety.

In order to generate Cs', the set of embedded coefficients, the original projections are subtracted from the quantized projections, and the result of each difference is evenly distributed through the M coefficients that comprise each row of Cs. Mathematically, this is given by the following equation for the kth row of Cs, where we see that the projection modulates the differences.

$$Cs'(k)=Cs+(Yq-Y)/M*P(k)$$

As shown in FIG. 11, the differences between the quantized and original projections are divided by M and multiplied by the pseudorandom array P(k) in block 150. The watermarked video image is created from the set of embedded coefficients, Cs, by de-interleaving the coefficients in block 152 labeled "Shuffle-1( )', replacing the original lowest 12 AC coefficients of every block with the embedded versions, and finally performing inverse 8×8 DCTs in block 154 (though this is not required where the steganographic embedder is integrated into the video compression coder.

FIG. 12 is a diagram illustrating a steganographic decoder for extracting steganographic information from a signal. The steganographic decoders operations beginning with the forward DCTs and ending with the set of projections onto the pseudo-random vectors, P, are a repeat of the corresponding steps in the embedder of FIG. 11 (blocks 160-166 correspond to blocks 140-146). Given each projection in turn, an estimate of the embedded message bit is obtained by determining which quantizer (e.g., quantizer 168 or 170) contains a centroid that is closer to the projection than all other centroids. This process is implemented by first using both quantizers to quantize the projection. The "Slicer( )" block 172 is responsible for choosing the quantizer that has the smaller quantization error and outputting the corresponding bit. One quantizer is labeled '1' and the other is labeled '0'. For example, if a projection is closest to a centroid in the '1' quantizer, a '1' bit is output.

FIGS. 13A-D are a diagram illustrating a content delivery workflow for the music industry.

FIGS. 14A-D are an updated version of FIGS. 13A-D that includes orchestrated encoding. These diagrams are each spread over four parts A-D. The symbols used in each part adhere to the legend in FIGS. 13A and 14A. The parts are connected with connector symbols (A-G) that connect arrow lines from one part to another. As each of FIGS. 13 A-D and FIGS. 14A-D represent variants of a single diagram, the following text refers to the diagram in FIGS. 13A-D, as FIG. 13, and refers to the diagram of FIGS. 14A-D as FIG. 14. While both diagrams show watermark encoders at various points in the workflow, the watermark encoding in FIG. 14 is orchestrated so that a layer of watermark applied upstream at content origination is respected and compatible with subsequent layers applied in downstream distribution channels. FIGS. 13 and 14 share several common components, and the description of these common components applies to both diagrams. Since we are primarily concerned with adding orchestrated encoding to the workflow, we refer specifically to FIG. 14 when discussing layered encoding and the encoder devices, software and computer systems used to implement it. Otherwise, description of common elements applies to both FIGS. 13 and 14.

The workflow is comprised of the following components: content origination, identity and metadata providers, rights collection agencies (organizations of rights holders, such as the performance rights holders), channel and consumer. The origination component refers to the processes and systems used to create recorded music. The identity and metadata provider component refers to the providers, processes and systems that issue identification codes, and collect and store metadata for items of recorded music (e.g., tracks, songs, or albums). The rights collection agencies refer to the organizations that represent rights holders, including organizations that manage licensing of rights in musical works, collect royalty audit information, and manage the process of distributing royalties to rights holders. The rights collection agencies also include database systems maintained by these agencies to store and provide rights holder metadata for copyrighted works managed by these agencies. The works and related metadata is indexed by one or more identifiers assigned to the works, such as the ISWC, ISNI, ISRC, etc. The channel component refers to the processes and systems for distributing recorded music items in distribution channels, including, for example, digital distribution (e.g., via Content Delivery Networks on the Internet that deliver music files and streams over the Internet for on-line fulfillment, e.g., on-line music stores), physical package distribution (e.g., distribution on a physical storage medium like a compact disk or DVD), or broadcast (e.g., terrestrial and satellite radio, cable, etc.). The consumer component refers to the processes and systems for consumption (e.g., rendering and playback) of the music items to consumers.

Before detailing the workflow further, it is helpful to begin with a glossary of terms and acronyms in the diagrams:

ISNI-International Standard Name Identifier—according to the ISNI International Agency, The International Standard Name Identifier (ISNI) is a draft ISO Standard (ISO 27729) whose scope is the identification of Public Identities of parties: that is, the identities used publicly by parties involved throughout the media content industries in the creation, production, management, and content distribution chains. The ISNI system uniquely identifies Public Identities across multiple fields of creative activity. The ISNI provides a tool for disambiguating Public Identities that might otherwise be confused. ISNI is not intended to provide direct access to comprehensive information about a Public Identity but can provide links to other systems where such information is held. An ISNI is made up of 16 decimal digits, the last one being a check character. Example: ISNI 1422 4586 3573 0476. ISNIs are assigned to the Public Identities of Parties that participate in the creation, production, management or distribution of cultural goods in the digital environment. Those Parties can be natural persons (a human being like a book author), legal entities (like a Record Label) or even fictional characters (like Peter Pan).

CISAC—The International Confederation of Authors and Composers Societies. CISAC's activities include developing an international network of copyright societies. CISAC members in the US include American Society of Composers, Authors and Publishers (ASCAP), Broadcast Music Incorporated (BMI), and SESAC Inc. (SESAC originally stood for Society of European Stage Authors &Composers). ASCAP, BMI and SESAC are sometimes referred to as Performance Rights Organizations (PROs). They monitor public performances of music, collect licensing fees from users of the music, and distribute theses fees to members as royalties.

Harry Fox—a rights collection agency collecting and distributing mechanical license fees on behalf of music publishers.

ISWC—International Standard Musical Work Code (ISWC) is a unique identifier for musical works, similar to ISBN. It is adopted as international standard ISO 15707. The ISO subcommittee with responsibility for the standard is TC 46/SC 9.

GS1—GS1 US BarCodes and eCom is the U.S. implementation organization for the GS1 System. The organization supports implementation of standardized identification numbers for use in barcodes and e-commerce messaging standards such as Electronic Data Interchange (EDI) and Business Message Standards using Extensible Markup Language (XML). The GS1 System provides identification numbers to uniquely identify trade items (products and services), logistic units, locations, assets, and service relations worldwide. For example, a Global Trade Item Number (GTIN), the most well known GS1 identification number, is the 12-digits shown below the Universal Product Code (U.P.C.) barcode.

IFPI the International Federation of the Phonographic Industry, a trade group representing the recording industry.

RIAA—Recording Industry Association of America, Trade group that represents recording industry entities in the US.

ISRC—International Standard Recording Code (ISRC), defined by ISO 3901, is an international standard code for uniquely identifying sound recordings and music video recordings. IFPI has been appointed by ISO as registration authority for this standard. The ISO technical committee 46, subcommittee 9 (TC 46/SC 9) is responsible for the standard. Note that an ISRC code identifies a particular recording, not the song itself. Therefore, different recordings, edits, and remixes of the same song will each have their own ISRC code. Songs are identified by analogous ISWC codes.

GRiD—The Global Release Identifier (GRid) is a system to identify releases of digital sound recordings (and other digital data) for electronic distribution. It is designed to be integrated with identification systems deployed by key stakeholders from across the music industry. A GRid consists of 18 alphanumerical characters (numerical digits and capital letters as defined in ISO/IEC 646:1991-IRV, which is identical to ASCII) that are grouped into four elements:

Identifier Scheme element (2 characters)—"A1" denotes a GRid.

Issuer Code element (5 characters)—A unique identifier of the organization responsible for allocating the GRid, issued by the International GRid Authority (i.e., the IFPI).

Release Number element (10 characters)—Uniquely identifies the specific bundle of digital resources compiled by the issuer, where "a digital resource is a digital fixation of an expression of an abstract work, such as a sound recording, an audio-visual recording, a photograph, software, a graphic image or a passage of text."

Check Character element (1 character)—The check character is computed according to ISO 7064:1983 Mod 37, 36.

DDEX-Digital Data Exchange the protocol used to transfer identifiers (e.g., GRiD, ISRC) and associated metadata among digital trading partners. DDEX standards are used by media companies including major record companies such as Sony Music and Warner Music Group, major rights societies such as ASCAP, BMI, the Harry Fox Agency, PRS for Music and SACEM, and digital and mobile service provides such as Apple iTunes, Muzak, Orange, SFR, Spotify, Real Networks, Telefónica Servicios de Música, and others.

Returning to FIG. 14, one of purposes of this diagram is to illustrate layered encoding in the specific environment of the music industry. The metadata for musical recordings provides a key role in the music industry. It enables rights holders to get paid for use of the content in various distribution channels. It enables the distribution and consumption of music to be measured, which provides metrics for determining royalties due to rights holders and metrics for determining pricing of advertising provided along with music. It enables the content to become a marketing channel for related products and services associated with the music. It also enhances the consumer experience by providing consumers additional information about music, enabling consumers to find related content (supports enhanced search services), purchase the music and related music, products and services. For example, metadata provided by companies like GraceNote and Rovi enable consumers to obtain song names, album art, and other descriptive metadata and attach it automatically to song files in their music libraries. Also, when used in conjunction with song identification and music library analysis software, it assists users in finding and organizing music within their own music libraries as well as in on-line libraries where song files can be streamed, file transferred and purchased.

Particularly in the current era in which the number of distribution channels and formats has proliferated, there is a need to bind the metadata to music. With increasing distribution and consumption, the amount of useful metadata describing the content and rights information is increasing, is critical to managing and monetizing content, and is even more difficult to keep associated with the music recording. This is evidenced by the vast number of ways that consumers can get content that is detached from metadata and the emergence of schemes for re-attaching at least some of the metadata of interest to consumers. Without such binding, the above referenced business models and consumer applications cannot be supported. Metadata is persistently bound to music signals by providing a means to associate the media signal itself with the metadata. This is achieved through watermarking or content fingerprinting, or a combination of both. In the case of watermarking, the encoded watermark provides metadata itself or an encoded identifier that acts as a reference to a database or network of databases that provide the metadata. In the case of content fingerprinting, the content fingerprint provides a means to identify the content (a form of inherent identifier derived from the content signal), which when matched with an entry in a database, provides an identity that is associated with metadata.

Within the workflow of FIG. 14, metadata is loosely connected with music recordings within controlled environments, such as in recording tools and Digital Asset Management (DAM) systems, by storing the metadata in a file structure or storage protocol that associates the metadata with the corresponding digital music signals. At the origination side of the workflow, this metadata includes standardized naming conventions used to identify rights holders, such as ISNI, ISWC, ISRC, etc. for song writers, recording artists, and other rights holders. Each of these identifier schemes provide a way of organizing additional metadata by providing a means for this additional metadata to be organized into databases according to the identifiers. However, when the music recording gets released from its controlled storage and distribution environments (namely the DAM of the record label), it gets detached from the metadata, including all of these identification codes that are associated with it. The role of the persistent metadata binding is to enable re-association of metadata, as well as new association of additional metadata to music recordings through the workflow. Consumer oriented services and software enable automated re-attachment of some of the metadata, such as song and album names, artists names and album art, yet metadata assigned at origination and useful for managing copyright and royalties is not effectively re-attached. This detachment of metadata can lead to a great deal of lost revenue due to rights holders.

As depicted in FIG. 14, metadata is created at various points in the music workflow. In many cases, new metadata is created after a music recording is created (e.g., after it is distributed in different distribution channels, is re-purposed for different uses, such as advertising, video programming, broadcast, or public performance). This continuous generation of metadata creates a need for "late-binding" of metadata, where new metadata is created and persistently bound with the music recording through the content fingerprint and/or the watermark is conveyed within the audio signal (or video/image signal for audio-visual and visual works).

As shown in FIG. 14, initial metadata identifying the songwriter and artist is carried in identifier codes such as ISNI, and ISWC. These codes are issued by an issuing authority and registered in a database. Note that the identity and metadata provider component in FIG. 14 illustrates this identifier issuer function and the associated registries. The codes issued via this process are forms of metadata, which also act as pointers to additional metadata by pointing back to databases of the issuing authorities or others that index metadata using these identifiers. In particular, the identification codes can be made public, but the codes reference proprietary metadata in disparate metadata databases controlled by rights holders or rights agencies.

The creative processes of song writing and arrangement are captured in a recording tool system. In this process, the music signal is initially captured and recorded, now typically in a digital signal format, but sometimes in analog storage formats. Initial metadata is stored in a loose coupling in the recording tool system.

The recording of the music and associated metadata is the "studio deliverable," which includes all of the metadata for rights holders stored in association with the music signal itself.

The next phase is mastering in a mastering system and processes. Mastering involves a transformation in electronic and often programmed computer devices (e.g., Digital Audio Workstation) of the audio signals of the work through a variety of processes like equalizing, optimizing loudness levels, dynamic expansion/contraction, noise reduction, fading in/out and clean up of start and end of tracks, etc. The output of mastering is a master recording, which is transmitted to the record label, the entity that controls the rights in the recording. At this point, an ISRC is assigned to the master recording. A GS1 code may also be assigned to it (e.g., an EAN 12 code). The master recording is managed in a Digital Asset Management system, which is system comprised of computer hardware and software that provide computer system functions for ingestion, annotation, cataloguing, storage, retrieval and distribution of digital assets. Typically, there is a high fidelity digital version of the music recording, and one or more lower fidelity versions (e.g., compressed, low resolution formats that are smaller in size and easier to output and render within the system).

As illustrated in the layered encoding of FIG. 14, the DAM preferably includes a watermark encoder to encode a watermark identifier in the music recording, and register the watermark identifier in a metadata database, e.g., including associate with auxiliary content identifier like an ISRC code as well as other metadata, including GS1 code, ISNI codes, ISWC codes, etc. In FIG. 14, this watermark identifier is denoted as a content identifier (CID), which is a unique identifier for the recording. The CID that the encoder embeds in the audio signal is preferably a Globally Unique Identifier. The GUID enables the creation of public and private de-referencing of metadata. For example, a public database for de-referencing the GUID (looking up metadata in the database indexed by the GUID) provides public metadata such as the GUID number itself and the name of the registration authority that assigned it or the authority (or authorities) that can provide private metadata linked to the GUID. For more information on such metadata referencing and routing, please see US Published Patent Application 2007-0208711, which is hereby incorporated by reference in its entirety. The benefit of such a public/private metadata referencing is that it allows several different stakeholders to control proprietary metadata linked to the work via the GUID embedded in it.

At this point of ingest, the DAM may also include a content fingerprint calculator that derives a content fingerprint and registers the fingerprint, along with an identifier such as the ISRC, in a fingerprint database. Preferably this fingerprint database provides an identity, like the GUID, that then references the distributed public/private metadata databases described above. There are now several different providers of content fingerprint technology. It may be advantageous to compute and register content fingerprints in several different formats compatible with these commercial technologies. The advantage, of course, is that it enables identification of the work by multiple different fingerprint technologies downstream in distribution.

Persistent identifiers that reside in the audio signal itself (including watermark or fingerprint) bind the content signal itself to the metadata previously created prior to entry within the record label's DAM system (Label Copy metadata) and additional metadata generated by the label (e.g., Release metadata originated from the Label). The ISRC can be used as a key to index other related metadata to the music signal recording. For example, the GUID look up provides the ISRC, which in turn, can be used to look up metadata in other databases indexed by the ISRC.

From this origination point in the workflow, the music recording is split into several different versions or releases. Examples of record label release channels include promotional release, digital partner delivery and CD mastering. Each of these channels can itself have multiple distribution channels. Promotional release for example, can include a release of a version stored on CD-R, an un-secure release (e.g., email of MP3 file), or a secure digital broadcast delivery over a network based digital music delivery system that includes encryption and associated content transformation as means to control access and use of the audio signal. As shown in FIG. 14, a second encoding layer is added and/or overwrites the watermark encoding applied to the music signal at the point of ingest in the DAM. This layer of encoding provides encoded data that either alone or together with the previous layer of encoding, uniquely serializes each release so that it can be separately identified.

Digital partner delivery includes a set of processes as well as the data processing equipment and systems that implement these processes. One process is trans-coding in which a programmed computer systems receives a version of the music recording and encodes it, or transcodes it, into a digital format for digital delivery. Another process is metadata insertion, which includes metadata particular to that release as well as other metadata. This metadata can be encoded along with the music signal in an auxiliary data channel, such as a file header (DDEX Structure). As in the case of promotional release, another layer of encoding is embedded to uniquely serialize each release in this channel. Preferably, this layer of encoding is integrated into the transcoding process. The versions released in this channel are distributed over the Internet through Content Delivery Network systems that interoperate with on-line music fulfillment services like Amazon and iTunes. One benefit of uniquely serializing each release is that it enables late binding of transaction metadata for each release. Transaction metadata includes not only transaction data collected from the CDN and fulfillment services, but also measurement data collected from the detection of the transaction watermark (shown as Encode Transaction (X') and Distributor (X") in FIG. 14.

Another release channel from the record label's DAM system is CD mastering. CD mastering is the process and associated equipment use to prepare recordings for distribution on packaged media, like CDs. Once released from CD mastering, the CD release is transmitted to the CD duplication plant, and then distributed. The workflow of FIG. 14 does not show a subsequent layer of encoding in the CD mastering release path, but one similar to the one used for promotional and digital partner delivery could be added. The initial watermark layer encoded at DAM ingest (shown as Encode Content ID (X) in FIG. 14) may suffice to provide a means of identifying the CD release version for late binding of metadata. If more granular differentiation of CD releases is desired, a unique watermark encoding layer can be embedded in each release.

The final aspect of the DAM system is its metadata database. The metadata collected by the label includes the Release Metadata for the master recording as transaction particular metadata for recordings distributed through the disparate channels, including the digital partner delivery (DDEX metadata for a song track and the transaction) and promotional delivery (transaction metadata relating to the distribution of tracks for promotional purposes). The transactional metadata includes a description of the transaction, such as recipient, time/date, location, rights and restrictions, etc. All of this metadata can be augmented post distribution with additional metadata using late binding. For example, distribution information can be collected from the various distribution channels, as well as marketing data, and transaction data as it is developed and linked to the particular recording via the CID or subsequent transactional encoding layers.

This metadata can then be distributed to metadata aggregators, search engines, etc. to provide services for metadata association with music wherever it is found or consumed later in distribution. One such company that provides metadata services is GraceNote. Another is Rovi.

Having now created a system for persistent identification for all recordings that pass through the record label, several downstream services are enabled. While FIG. 14 shows a single instance of a DAM, this workflow can be replicated for multiple record labels and their DAMs. The registries used to issue the CID (e.g., GUIDs that reference public/private metadata) and subsequent transactional IDs can be centralized or distributed across several different issuing authorities, registries and services for looking up metadata using these IDs.

One downstream application is a monitoring and measurement service where content is captured at points of interest in distribution channels, and watermark decoders are used to extract one or more encoding layers from the captured content as well as pertinent contextual data of the instance captured (such as time, place, channel). The data compiled from the decoding is used to produce reports that are critical to various business models, such as royalty reports for distributing royalty fees, audience measurement reports for determining advertising pricing and tailoring marketing/advertising, policing copyright infringement, etc. One form of monitoring is monitoring of distribution channels by rights societies to determine usage and collect royalties. Another form of monitoring is to measure audience exposure. An example of this is the radio audience measurement system, which is described in this document.

Other downstream applications include metadata re-association for consumer applications, such as software and web services for augmenting personal music libraries with metadata for the songs in the libraries, providing enhanced automated song recognition software and web services that deliver richer metadata, providing automated song recommendation services like the Genius feature in iTunes from Apple Computer based on more extensive and accurate metadata, etc.

The layered encoding scheme interacts with metadata collection by updating the metadata each time a new layer of encoding is added to a version of the song. This metadata need not be all centralized in a single database, yet it is made accessible and exploitable by using a GUID assignment protocol and cross referencing of GUIDs for versions of the same song. As noted above, one approach is to read the pre-existing watermark layer at each encoding point in the workflow, and register the new watermark information in a manner that cross references the existing watermark layers. In this way, a transaction history and distribution history can be compiled from the metadata registries referenced by the watermark in the audio signal. Of course, if the downstream watermark does not overwrite the upstream watermark, each watermark layer can be read independently. The insertion of encoders upstream and downstream locations extends the measurement capability of the decoder network to virtually all distribution paths of the song. FIG. 14 shows several examples where an audience measurement decoder, such as a PPM can now effectively decode layers of watermarks in songs distributed in multiple different distribution channels, as well as at several points of distribution of the same content, as it is transformed into versions, re-distributed and re-purposed for different uses. Examples include decoding from content captured from TV, theatrical releases, placed based advertising, mobile phones, mobile media players, PCs in addition to the existing radio audience measurement. In addition, data services enabled from this decoding include royalty auditing, marketing intelligence (including pricing for advertising and advertising placement systems), and consumer metadata services.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding and decoding processes, such as steganographic encoding and decoding methods, may be implemented in modules of program instructions executed on a programmable computer or converted into digital logic circuit modules of a special purpose digital circuit and/or programmable gate arrays. Computers include programmable processors, such as devices with microprocessors, Digital Signal Processors (DSPs), etc. Similarly, additional methods, such as signal processing methods, compression and data coding techniques, etc. described above may be implemented in software, firmware, hardware, or combinations of software, firmware and hardware, in programmable computers, devices and special purpose circuit modules. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

The invention claimed is:

1. A method of digital watermark processing, the method comprising:
receiving a content signal;
performing a watermark decoding on the content signal;
from the watermark decoding, determining a watermark state of the content signal;
evaluating a watermarking rule based on the watermark state to determine watermark encoding to apply to the content signal to comply with the watermarking rule; and
performing the watermark encoding on the content signal to embed a digital watermark layer into the content signal;
wherein the watermark rule enforces a priority of plural watermark layers by determining when to overwrite a previously embedded watermark with a new watermark layer based on the watermark state and a determined user goal;
wherein the determined user goal comprises embedding watermark information to signal an event in the content signal to which a desired behavior triggered by the digital watermark layer is to be synchronized.

2. The method of claim 1 wherein the watermark rule manages use of a limited bandwidth within the content signal for carrying plural watermark layers by selecting between overwriting a pre-existing watermark layer, and embedding a new watermark layer that co-exists with the pre-existing watermark layer.

3. The method of claim 1 wherein the watermark rule specifies that a distributor identifier and time stamp are to be embedded in the content signal and indexed to a corresponding content identifier for a portion of the content signal in which the distributor identifier and time stamp are embedded.

4. The method of claim 1 wherein the watermark state is determined by detecting a watermark protocol of a watermark embedded in the content signal.

5. The method of claim 4 wherein the watermark protocol is determined from detection of embedded synchronization signals in the content signal.

6. The method of claim 1 wherein the digital watermark layer is multiplexed within the content signal with a preexisting watermark layer by frequency multiplexing frequency components of the digital watermark layer with frequency components of the preexisting watermark layer.

7. The method of claim 1 wherein the watermark encoding comprising encoding the watermark layer so that the watermark layer overwrites a preexisting digital watermark layer, and information from the preexisting watermark layer is indexed to a information in the digital watermark layer in a database.

8. A non-transitory computer readable medium on which is stored instructions, which, when executed by a computer, perform a method of digital watermark processing on an electronic content signal, the method comprising:
performing a watermark decoding on the content signal;
from the watermark decoding, determining a watermark state of the content signal;
evaluating a watermarking rule based on the watermark state to determine watermark encoding to apply to the content signal to comply with the watermarking rule; and
performing the watermark encoding on the content signal to embed a digital watermark layer into the content signal;

wherein the watermark rule enforces a priority of plural watermark layers by determining when to overwrite a previously embedded watermark with a new watermark layer based on the watermark state and a determined user goal;

wherein the determined user goal comprises embedding watermark information to signal an event in the content signal to which a desired behavior triggered by the digital watermark layer is to be synchronized.

9. A digital watermark processor, the processor comprising:

means for receiving a content signal;

means for performing a watermark decoding on the content signal;

means for determining, from the watermark decoding, a watermark state of the content signal;

means for evaluating a watermarking rule based on the watermark state to determine watermark encoding to apply to the content signal to comply with the watermarking rule; and means for performing the watermark encoding on the content signal to embed a digital watermark layer into the content signal;

wherein the watermark rule enforces a priority of plural watermark layers by determining when to overwrite a previously embedded watermark with a new watermark layer based on the watermark state and a determined user goal;

wherein the determined user goal comprises embedding watermark information to signal an event in the content signal to which a desired behavior triggered by the digital watermark is to be synchronized.

10. The processor of claim 9 wherein the means for evaluating manages, based on the watermark rule, a use of a limited bandwidth within the content signal for carrying plural watermark layers by selecting between overwriting a pre-existing watermark layer, and embedding a new watermark layer that co-exists with the pre-existing watermark layer.

11. The processor of claim 9 wherein the watermark rule specifies that a distributor identifier and time stamp are to be embedded in the content signal and indexed to a corresponding content identifier for a portion of the content signal in which the distributor identifier and time stamp are embedded.

12. The processor of claim 9 wherein the watermark state is determined by detecting a watermark protocol of a watermark embedded in the content signal.

13. The processor of claim 12 wherein the watermark protocol is determined from detection of embedded synchronization signals in the content signal.

14. The processor of claim 12 wherein the digital watermark layer is multiplexed within the content signal with a preexisting watermark layer by frequency multiplexing frequency components of the digital watermark layer with frequency components of the preexisting watermark layer.

15. The processor of claim 12 wherein the watermark encoding comprising encoding the digital watermark layer so that the watermark layer overwrites a preexisting digital watermark layer, and information from the preexisting watermark layer is indexed to a information in the digital watermark layer in a database.

* * * * *